United States Patent
Li et al.

(10) Patent No.: US 11,297,660 B2
(45) Date of Patent: Apr. 5, 2022

(54) SESSION MANAGEMENT WITH RELAYING AND CHARGING FOR INDIRECT CONNECTION FOR INTERNET OF THINGS APPLICATIONS IN 3GPP NETWORK

(71) Applicant: CONVIDA WIRELESS, LLC, Wilmington, DE (US)

(72) Inventors: Hongkun Li, Malvern, PA (US); Michael F. Starsinic, Newtown, PA (US); Rocco Di Girolamo, Laval (CA); Catalina Mihaela Mladin, Hatboro, PA (US); Mahmoud Watfa, Saint Leonard (CA)

(73) Assignee: Convida Wireless, LLC, Wilmington, DE (US)

( * ) Notice: Subject to any disclaimer, the term of this patent is extended or adjusted under 35 U.S.C. 154(b) by 6 days.

(21) Appl. No.: 16/339,517

(22) PCT Filed: Oct. 6, 2017

(86) PCT No.: PCT/US2017/055573
§ 371 (c)(1),
(2) Date: Apr. 4, 2019

(87) PCT Pub. No.: WO2018/067956
PCT Pub. Date: Apr. 12, 2018

(65) Prior Publication Data
US 2020/0053802 A1 Feb. 13, 2020

Related U.S. Application Data

(60) Provisional application No. 62/440,678, filed on Dec. 30, 2016, provisional application No. 62/404,909, filed on Oct. 6, 2016.

(51) Int. Cl.
*H04W 76/10* (2018.01)
*H04W 12/06* (2021.01)
(Continued)

(52) U.S. Cl.
CPC ............. *H04W 76/10* (2018.02); *H04W 4/70* (2018.02); *H04W 8/08* (2013.01); *H04W 8/20* (2013.01);
(Continued)

(58) Field of Classification Search
CPC ..... H04W 4/70; H04W 12/0401; H04W 8/08; H04W 8/20; H04W 68/005; H04W 76/10; H04W 12/06; H04W 12/041
See application file for complete search history.

(56) References Cited

U.S. PATENT DOCUMENTS 9,973,877 B2 *  5/2018  Liao ..................... H04L 5/0001
10,219,143 B2 *  2/2019  Yu ........................ H04L 69/324
(Continued)

FOREIGN PATENT DOCUMENTS

CN  104396217 A  3/2015
GB  2513896 A  11/2014
(Continued)

OTHER PUBLICATIONS

3GPP Standard; 3GPP TR 23.799, 3rd Generation Partnership Project (3GPP), Nobile Competence Centre ; 650, Route Des Lucioles ; F-06921 Sophia-Antipolis Cedex; France, vol. SA WG2, No. V1.0.2, Sep. 30, 2016 (Sep. 30, 2016), pp. 1-423, XP051172701.*
(Continued)

*Primary Examiner* — Magdi Elhag
(74) *Attorney, Agent, or Firm* — BakerHostetler

(57) ABSTRACT

The application is at least directed to a core network including a non-transitory memory including instructions stored thereon for transferring infrequent small data to a service capability or application server on a 5G network. The core network also includes a processor operably coupled to the non-transitory memory. The processor is configured to execute the instructions of detecting a relay
(Continued)

user equipment (UE) sending a data transfer request message to the core network based on uplink traffic generated at a remote UE and control information of the remote UE. The processor is also configured to execute the instructions of querying a database in the core network for subscription information of the remote UE based on the control information. The processor is also configured to execute the instructions of receiving the subscription information from the database. The processor is further configured to execute the instructions of processing the received subscription information. The processor is even further configured to execute the instructions of selecting a network function for transmitting the uplink traffic to the server based on the processing instruction.

20 Claims, 22 Drawing Sheets

(51) Int. Cl.

| | | |
|---|---|---|
| *H04W 4/70* | (2018.01) | |
| *H04W 8/08* | (2009.01) | |
| *H04W 8/20* | (2009.01) | |
| *H04W 68/00* | (2009.01) | |
| *H04W 12/041* | (2021.01) | |
| *H04W 88/04* | (2009.01) | |
| *H04W 88/14* | (2009.01) | |

(52) U.S. Cl.
CPC ......... *H04W 12/041* (2021.01); *H04W 12/06* (2013.01); *H04W 68/005* (2013.01); *H04W 88/04* (2013.01); *H04W 88/14* (2013.01)

(56) References Cited

U.S. PATENT DOCUMENTS

| | | | | |
|---|---|---|---|---|
| 2013/0301611 | A1* | 11/2013 | Baghel | H04L 63/123 |
| | | | | 370/331 |
| 2016/0044002 | A1* | 2/2016 | Ying | H04W 12/04 |
| | | | | 713/168 |
| 2016/0157084 | A1 | 6/2016 | Tsubouchi | |
| 2016/0212728 | A1* | 7/2016 | Chang | H04W 68/025 |
| 2016/0344726 | A1* | 11/2016 | Stojanovski | H04L 9/3247 |
| 2016/0373976 | A1* | 12/2016 | Griot | H04W 48/18 |
| 2016/0374048 | A1* | 12/2016 | Griot | H04W 4/70 |
| 2017/0064611 | A1* | 3/2017 | Aghili | H04W 4/70 |
| 2017/0251516 | A1* | 8/2017 | Bangolae | H04W 76/27 |
| 2017/0366343 | A1* | 12/2017 | Wifvesson | H04L 63/061 |
| 2018/0098370 | A1* | 4/2018 | Bangolae | H04W 76/27 |
| 2019/0014464 | A1* | 1/2019 | Kuge | H04W 52/0229 |
| 2019/0253870 | A1* | 8/2019 | Ronneke | H04W 8/245 |

FOREIGN PATENT DOCUMENTS

| | | |
|---|---|---|
| WO | 2016/045602 A1 | 3/2016 |
| WO | 2016/069571 A1 | 5/2016 |

OTHER PUBLICATIONS

3GPP TR 23.718 V13.0.0, "3rd Generation Partnership Project; Technical Specification Group Services and System Aspects; Architecture Enhancement for Flexible Mobile Service Steering (Release 13)", Sep. 2015, 38 pages.

3GPP TR 23.720 V13.0.0, "3rd Generation Partnership Project; Technical Specification Group Services and System Aspects; Study on Architecture Enhancements for Cellular Internet of Things (Release 13)", Mar. 2016, 94 pages.

3GPP TS 23.303 V13.6.0, 3rd Generation Partnership Project; Technical Specification Group Services and System Aspects; Proximity-Based Services (ProSe); Stage 2 (Release 13), Dec. 2016, 124 pages.

3GPP TS 23.401 V13.6.1, "3rd Generation Partnership Project; Technical Specification Group Services and System Aspects; General Packet Radio Service (GPRS) Enhancements for Evolved Universal Terrestrial Radio Access Network (E-UTRAN) Access (Release 13)", Mar. 2016, 365 pages.

3GPP TS 23.682 V13.5.0, "3rd Generation Partnership Project; Technical Specification Group Services and System Aspects; Architecture Enhancements to Facilitate Communications with Packet Data Networks and Applications (Release 13)".

3GPP TS 24.334 V13.4.1 3rd Generation Partnership Project; Technical Specification group Core Network and Terminals; Proximity-services (ProSe) User Equipment (UE) to ProSe function protocol aspects; Stage 3 (Release 13), Jun. 2016, 260 pages.

ETSI GS NFV 002 V1.1.1, Group Specification, "Network Functions Virtualisation (NFV); Architectural Framework", Oct. 2013, 21 pages.

NGMN Alliance, ngmn the engine of broadband wireless innovation, NGMN 5G P1 Requirements & Architecture Work Stream End-to-End Architecture, "Description of Network Slicing Concept" Version 1.0, Jan. 2016, 7 pages.

OneM2M Technical Specification TS-0001 v2.3.0, "Functional Architecture", Aug. 2015, 352 pages.

* cited by examiner

SESSION MANAGEMENT WITH RELAYING AND CHARGING FOR INDIRECT CONNECTION FOR INTERNET OF THINGS APPLICATIONS IN 3GPP NETWORK

CROSS-REFERENCE TO RELATED APPLICATIONS

This application is the National Stage Application of International Patent Application No. PCT/US2017/055573 filed Oct. 6, 2017 which claims the benefit of priority of U.S. Provisional Application No. 62/404,909, filed Oct. 6, 2016, entitled "Session Management with Relaying and Charging for Indirect Connection for Internet of Things Applications in 3GPP Network" and U.S. Provisional Application No. 62/440,678 filed Dec. 30, 2016, entitled "Session Management with Relaying and Charging for Indirect Connection for Internet of Things Applications in 3GPP Network" the contents of both are hereby incorporated by reference in their entireties.

BACKGROUND

The world is experiencing a proliferation of cellular Internet of Things (IoT) devices in the 4G network. In the near future, it is expected there will be orders of magnitude more cellular IoT devices deployed in the 5G network. Examples of IoT devices include and not limited to wearable devices such as smart watches, medical devices, home automation equipment, and environmental sensors. IoT devices are generally power constrained and deployed. As a result, IoT devices are deployed within buildings and attach to a network via a relay user equipment (UE).

Communicating via a relay node allows the IoT device to use a limited transmission range. Consequently, the IoT device saves power and limits the number of devices needing to directly communicate with the base station. Protocols and architecture allowing a core network and/or application server to configure a remote UE's network connection to the 5G network is needed.

At times, it may be inefficient for a relay UE to establish and maintain separate sessions for every remote UE desiring a relay. What is needed are improved session management protocols and architectures for devices in the 5G network.

Presently, the core network cannot properly charge subscribers for traffic generated in 5G networks. What is desired is an efficient technique and architecture whereby the core network can distinguish between regular and relayed UE traffic to charge according to predetermined rates.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to solutions to overcome session management problems when using relays in the 5G network.

One aspect of the application is directed to a core network including a non-transitory memory including instructions stored thereon for transferring infrequent small data to a service capability or application server on a 5G network. The core network also includes a processor operably coupled to the non-transitory memory. The processor is configured to execute the instructions of detecting a relay user equipment (UE) sending a data transfer request message to the core network based on uplink traffic generated at a remote UE and control information of the remote UE. The processor is also configured to execute the instructions of querying a database in the core network for subscription information of the remote UE based on the control information. The processor is also configured to execute the instructions of receiving the subscription information from the database. The processor is further configured to execute the instructions of processing the received subscription information. The processor is even further configured to execute the instructions of selecting a service capability exposure function for transmitting the uplink traffic to the server based on the processing instruction.

A second aspect of the application is directed to a core network including a non-transitory memory including instructions stored thereon for transferring downlink data to a remote user equipment (UE) unattached to the core network. The core network also includes a processor operably coupled to the non-transitory memory. The processor is configured to execute the instructions of receiving, from a service capability or application server, downlink data for forwarding to a network function associated with the remote UE. The processor is also configured to execute the instructions of querying, in the core network, for the network function based on the received downlink data. The processor is also configured to execute the instructions of locating the network function from the querying instruction. The processor is further configured to execute the instructions of sending the downlink data to the remote UE via the network function.

Another aspect of the application is directed to a computer-implemented apparatus in a 3GPP network. The apparatus includes a non-transitory memory including instructions for relay configuration in the 3GPP network. The apparatus also includes a processor operably coupled to the non-transitory memory. The processor is configured to execute the instructions of performing discovery in a predetermined area of the 3GPP network for a remote user equipment (UE). The processor is also configured to execute the instructions of receiving a communication request message from the remote UE. The processor is also configured to execute the instructions of establishing a connection with the remote UE. The processor is also configured to execute the instructions of transmitting a session creation request message to a core network for creating a non-IP packet data network connection. The processor is further configured to execute the instructions of receiving a session confirmation from the core network based on the transmitting instruction. The processor is even further configured to execute the instructions of sending non-IP data originating from the remote UE to the core network.

Yet another aspect of the application is directed to a core network including a non-transitory memory including instructions for relay configuration on a 5G. The core network also includes a processor operably coupled to the non-transitory memory. The processor is configured to execute the instructions of receiving, at the core network, a configuration request including a non-IP data delivery from a service capability or application server. The processor is also configured to execute the instructions of processing the configuration request. The processor is also configured to execute the instructions of requesting authorization of the non-IP data delivery from a home subscriber server in the core network. The processor is further configured to execute the instructions of receiving authorization from the home subscriber service. The processor is even further configured to execute the instructions of sending the authorization to the service capability or application server.

A further aspect of the application is directed to a core network including a non-transitory memory including instructions stored thereon for relay configuration in a 5G network. The core network also includes a processor operably coupled to the non-transitory memory. The processor is configured to execute the instructions of receiving, from a relay user equipment (UE), a request including parameters to relay data between a remote UE and a service capability server or application server. The processor is also configured to execute the instructions of querying a database in the core network based on the parameters in the received request. The processor is further configured to execute the instructions of determining the relay UE is authorized to relay data on behalf of the remote UE. The processor is even further configured to execute the instructions of sending a reply to the relay UE based on the determination.

Yet a further aspect of the application is directed to a computer-implemented apparatus in a 3GPP network. The apparatus includes a non-transitory memory including instructions for aggregated, relay configuration in the 3GPP network. The apparatus also includes a processor operably coupled to the non-transitory memory. The processor is configured to execute the instructions of detecting plural remote user equipment (UE) connected to the apparatus. The processor is also configured to execute the instructions of determining, based on the plural, remote UE, to create a new session for aggregating and relaying uplink data. The processor is also configured to execute the instructions of sending a request for the new session to the core network. The processor is further configured to execute the instructions of receiving, from the core network, a response based on processed subscription information of the plural, remote UEs and a selected network function to create the new session. The processor is even further configured to execute the instructions of sending uplink data from the plural, remote UEs to a service capability or application server via a network function in the core network.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION

Figure 1A:
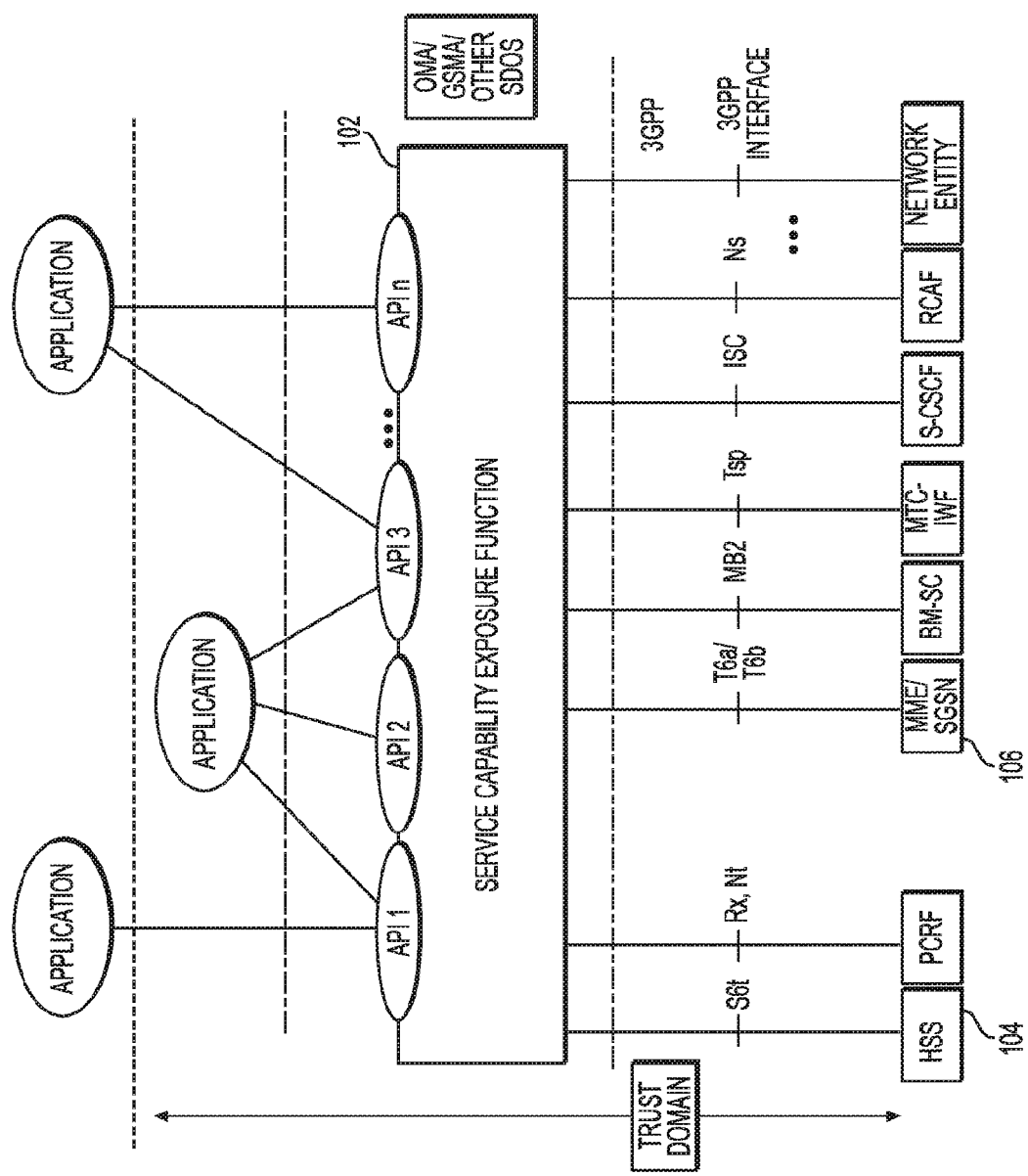
FIG. 1A is a diagram of a Service Capability Exposure Function Architecture in EPC.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

One aspect of the application describes solutions to the problem of how the 5G core network and/or application server (AS) can configure a remote UE's network connection. An AS and a remote UE provide context information to the core network to assist in the relay node selection procedure. Examples of context information include local server information, application information, access type, etc.

According to a second aspect of the application, solutions to overcome problems of how small data can be efficiently relayed from a remote UE to AS through the relay and CN. Procedures are described where the (remote) UE may send UL data together with some additional control information over a connectionless session through CP even without the remote UE or relay UE previously attaching to the network.

In addition, methods of transferring DL small data are described as well. For DL data transfer, the remote UE may have provided an indicator, when configuring its relay support that it expects to be connected via the same RN for some time, so that CN knows how to reach this remote UE.

According to yet another aspect of the application, a different approach to managing session(s) between remote UE(s) and the core network is described. The relay UE can create a session for a group of constrained IoT devices, the relay UE will then aggregate the UL traffic from those devices and forward to the core network.

A further aspect of the application describes how the core network may differentiate not only between regular UE traffic and relayed UE, but it must also be able to determine which subscriber is associated with the relayed traffic.

Definitions and Acronyms

Provided below are definitions for terms and phrases used in this application in Tables 1 and 2, respectively.

TABLE 1

| TERM OR PHRASE | DEFINITION |
| --- | --- |
| Network Function (NF) | A NF can be a processing function in a network, which has defined functional behavior and defined interfaces. A NF can be implemented either as a network element on a dedicated hardware, or as a software instance running on a dedicated hardware, or as a virtualized function instantiated on an appropriate platform, e.g., on a cloud infrastructure. |
| Network Slice Template | A Network Slice Template can be a set of NW functions that support certain application profile(s). |
| Network Slice Instance | Network Slice Instance can be an instantiation of a NW Slice Template. |
| PDU session | PDU session can be an association between the UE and a data network that provides a PDU Connectivity Service. Two types of PDU sessions are defined:<br>IP Type - data network is IP type<br>Non-IP type - data network is non-IP |
| UE Capability Profile | UE Capability Profile can be what the UE is capable of doing. This profile is typically static. For example, if the UE has relay capabilities, the UE's category (e.g. maximum data rate), screen size, voice capable, IMS capable, GPS capable, etc. |
| UE Service Profile | UE Service Profile can be what the UE is trying to do, may try to do, or wants to try to do. A UE's Service Profile defines what services the UE wishes to access. The network may provide these services via one or more network slice instances. A UE's Service Profile may include its location. |
| Session Management in 3GPP CN | In 3GPP CN, session management is to manage the end-to-end PDN connection (IP or non-IP type) between UE and packet data network for the data transfer through the core network with policy (e.g., QoS) and charging control enforced. |
| Remote UE | Remote UE can be an end device that is out of communication range of a base station, and needs an intermediate node to relay its traffic to/from mobile core network. |
| Relay Node/UE | Relay Node/UE can be an intermediate node that forward traffic between a remote UE and mobile core network |

TABLE 2

| ACRONYM | PHRASE |
| --- | --- |
| AAA | Authentication, Authorization, and Accounting |
| AF | Application Function |
| AMF | Access and Mobility Management Function |
| APN | Access Point Name |
| API | Application Program Interface |
| AS | Application Server |
| CIoT | Cellular Internet of Thing |
| CN | Core Network |
| CP | Control Plane |
| DL | Downlink |
| EPC | Evolved Packet Core |
| EPS | Evolved Packet System |

TABLE 2-continued

| ACRONYM | PHRASE |
| --- | --- |
| GUTI | Globally Unique Temporary UE Identity |
| HLR | Home Location Register |
| HSS | Home Subscriber Server |
| IE | Information Element |
| IMSI | International Mobile Subscriber Identity |
| L-GW | Local Gateway |
| LTE | Long Term Evolution |
| MM | Mobility Management |
| MME | Mobility Management Entity |
| N3IWF | Non-3GPP Inter-Working Function |
| NAS | Non Access Stratum |
| NEF | Network Exposure Function |
| NF | Network Function |
| NIDD | Non-IP Data Delivery |
| PCF | Policy Control Function |
| PCRF | Policy and Charging Rules Function |
| PDN | Packet Data Network |
| PDU | Packet Data Unit |
| P-GW | PDN Gateway |
| ProSe | Proximity Service |
| QoS | Quality of Service |
| RAN | Radio Access Network |
| RAT | Radio Access Technology |
| SCS | Service Capability Server |
| SCEF | Service Capability Exposure Function |
| SGSN | Serving GPRS Support Node |
| S-GW | Serving Gateway |
| SM | Session Management |
| SMF | Session Management Function |
| TAU | Tracking Area Update |
| UDM | Unified Data Management |

TABLE 2-continued

| ACRONYM | PHRASE |
|---|---|
| UE | User Equipment |
| UL | Uplink |
| UP | User Plane |
| UPF | User Plane Function |

The Service Capability Exposure Function (SCEF) is defined in 3GPP TS 23.682, "Architecture enhancements to facilitate communications with packet data networks and applications." FIG. 1a illustrates an exemplary architecture of the SCEF 102. The SCEF 102 is always within the trust domain. An application can belong to the trust domain or may lie outside the trust domain. The following points summarize some features of the SCEF 102 including, for example: (i) the Service Capability Exposure Function (SCEF) provides a means to securely expose the services and capabilities provided by 3GPP network interfaces; (ii) the SCEF 102 provides a means for the discovery of the exposed service capabilities; (iii) the SCEF 102 provides access to network capabilities through homogenous network application programming interfaces (e.g. Network API) defined by OMA, GSMA, and possibly other signaling station bodies. The SCEF 102 abstracts the services from the underlying 3GPP network interfaces and protocols; (iv) individual instances of SCEF 102 may vary depending on what service capabilities are exposed and what API features are supported.

Figure 1B:
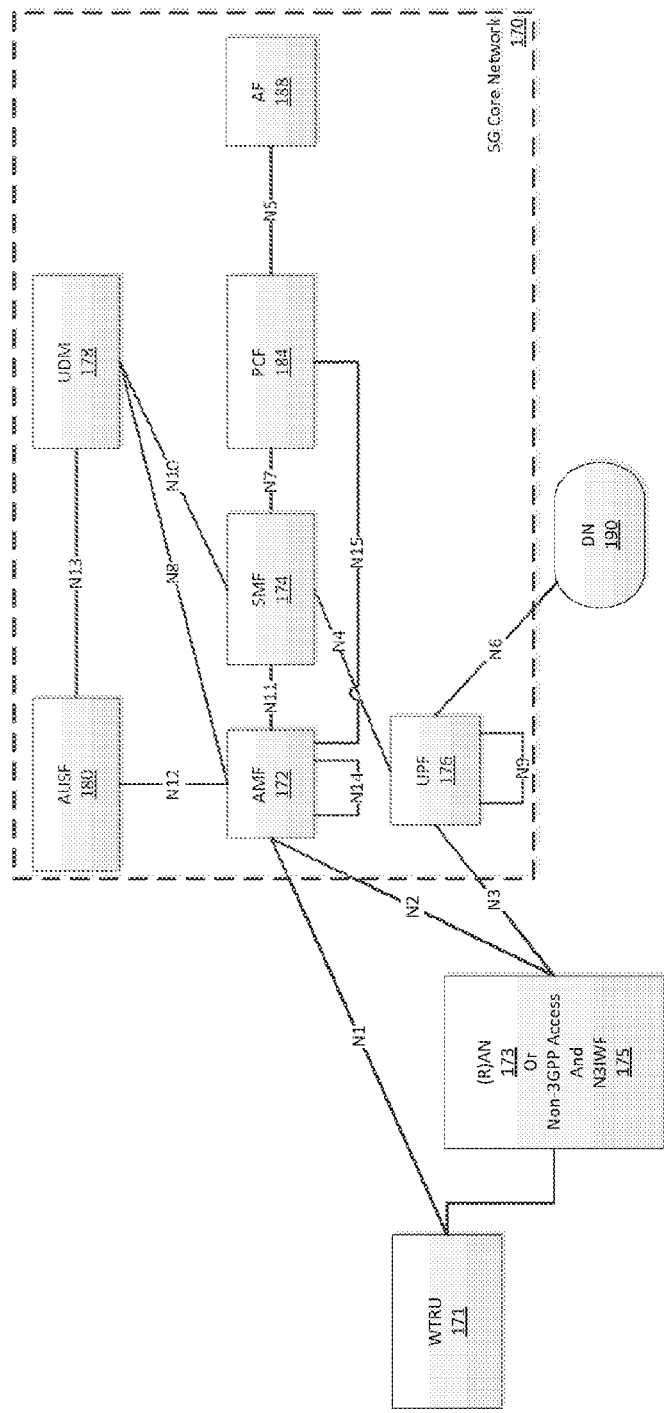
FIG. 1B is a diagram of the Non-roaming 5G System Architecture with Reference Point Representation.

The architecture of the non-roaming 5G core network 170 is defined in 3GPP TS 23.501, as shown in FIG. 1b may include an access and mobility management function (AMF) 172, a session management function (SMF) 174, one or more user plane function (UPF) 176, a Unified Data Management (UDM) 178 for user data management, an authentication server function (AUSF) 180, a Network Exposure Function (NEF), a policy control function (PCF) 184, a non-3GPP interworking function (N3IWF) 175 and an application function (AF) 188. While each of the foregoing elements are depicted as part of the 5G core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 1B shows that network functions directly connect to one another, however, it should be appreciated that they may communicate via routing agents such as diameter routing agents or message buses.

The AMF 172 may be connected to each of the RAN 173 via an N2 interface and may serve as a control node. For example, the AMF 172 may be responsible for registration management, connection management, reachability management, access authentication, access authorization. The AMF 172 may generally route and forward NAS packets to/from the WTRUs 171.

The SMF 174 may be connected to the AMF 172 via an N11 interface, maybe connected to a PCF 184 via an N7 interface, and may be connected to the UPF 176 via an N4 interface. The SMF 174 may serve as a control node. For example, the SMF 174 may be responsible for Session Management, WTRUs 171 IP address allocation & management and configuration of traffic steering rules in the UPF 176, and generation of downlink data notifications.

The SMF 174 may also be connected to the UPF 176, which may provide the WTRUs 171 with access to a data network (DN) 190, such as the Internet 110, to facilitate communications between the WTRUs 171 and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 175 via an N2 interface. The N3IWF 175 facilities a connection between the WTRUs 171 and the 5G core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the 5G core network 170. The NEF may connect to an AF 188 via an interface and it may connect to other control plane and user plane functions (180, 178, 172, 174, 184, 176, and N3IWF 175) in order to expose the capabilities and services of the 5G core network 170.

The 5G core network 170 may facilitate communications with other networks. For example, the core network 170 may include, or may communicate with, an IP gateway (e.g., an IP multimedia subsystem (IMS) server) that serves as an interface between the 5G core network 170 and the PSTN. For example, the core network 170 may include, or communicate with a short message service (SMS) service center that facilities communication via the short message service. For example, the 5G core network 170 may facilitate the exchange of non-IP data packets between the WTRUs 171 and servers. In addition, the core network 170 may provide the WTRUs 171 with access to the networks, which may include other wired or wireless networks that are owned and/or operated by other service providers.

The session management mechanisms are used to establish the IP based PDN connection [3GPP TS 23.401, General Packet Radio Service (GPRS) enhancements for Evolved Universal Terrestrial Radio Access Network (E-UTRAN) access, Release 13 for 3GPP EPC]. In traditional 3GPP CN, the session is created in when a UE is attached to the network to connect UE with a PDN. Specifically, in 3GPP EPC, a PDU session may consists of multiple bearers, each of which may carry different types of data flows with different QoS. A default bearer is established when a session is created.

There are two key issues discussed about non-IP data transfer for CIoT [3GPP TR 23.720]: (i) efficient support of infrequent small data transmission for Cellular IoT; and (ii) support of Non IP data.

One of the accepted solutions by 3GPP [3GPP TS 23.682] utilizes the control plane (CP) to transfer the infrequent small non-IP data for those IoT applications. Specifically, the non-IP data could be delivered via MME-SCEF control plane between UE and SCS/AS. Non-IP data delivery (NIDD) via the SCEF 102 is handled using a PDN connection to the SCEF 102. The UE may obtain a Non-IP PDN connection to the SCEF 102 either during the Attach procedure [3GPP TS 23.401, General Packet Radio Service (GPRS) enhancements for Evolved Universal Terrestrial Radio Access Network (E-UTRAN) access, Release 13] or via UE requested PDN connectivity.

Figure 2:
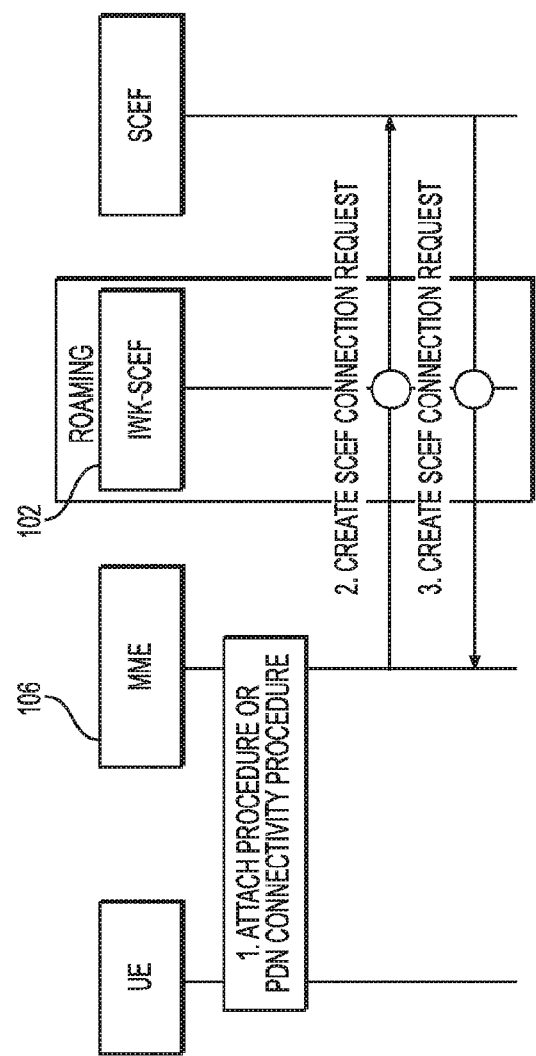
FIG. 2 is a diagram of a T6a Connection Establishment Procedure.

When the UE performs the EPS attach procedure with PDN type of "Non-IP", and the subscription information corresponding to either the default APN for PDN type of "Non-IP" or the UE requested APN includes the "Invoke SCEF Selection" indicator, then the MME initiates a T6a connection towards the SCEF 102 corresponding to the "SCEF ID" indicator for that APN. FIG. 2 shows the T6a connection establishment procedure, including the roaming scenario.

Figure 3:
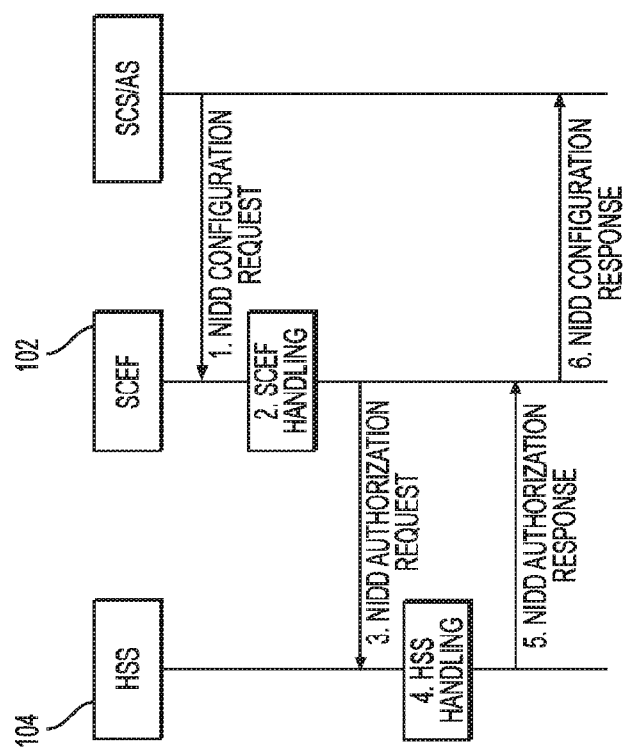
FIG. 3 is a diagram of a Configuration for NIDD procedure.

FIG. 3 illustrates the procedure of configuring necessary information at the SCEF 102, and HSS 104, and MME 106 for transferring non-IP data. The procedure can also be used for replacing and deleting configuration information.

Figure 4:
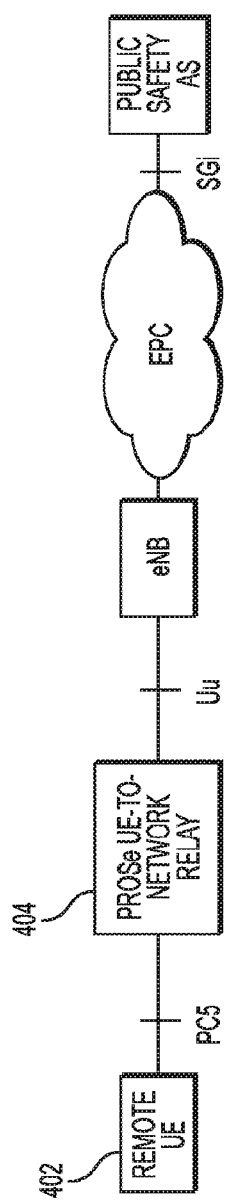
FIG. 4 is a diagram of an Architecture model using a ProSe UE-to-Network Relay.

3GPP ProSe UE-to-Network Relay entity provides the functionality to support connectivity to the network for Remote UEs. FIG. 4 shows the architecture model using a ProSe UE-to-Network Relay 404. The ProSe UE-to-Network Relay 404 may relay unicast traffic (DL and UL) to remote UE 402, and also the eMBMS traffic using one-to-many ProSe Direct Communication.

Figure 5:
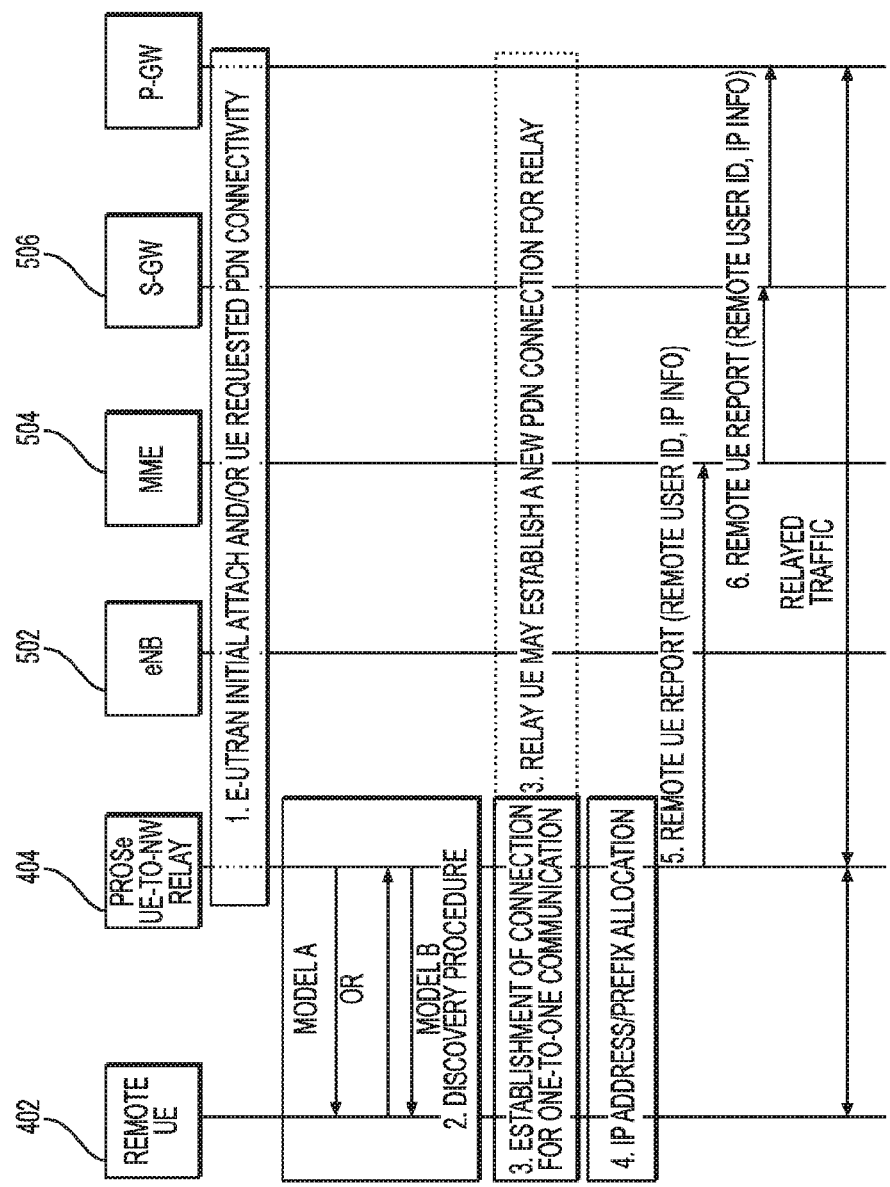
FIG. 5 is a diagram of a Direct Communication via ProSe UE-to-Network Relay.

FIG. 5 shows the procedure of direct communication via the relay for 3GPP ProSe. A ProSe UE-to-Network Relay capable UE may attach to the network (if it is not already connected) and connect to a PDN connection enabling the necessary relay traffic, or it may need to connect to additional PDN connection(s) in order to provide relay traffic towards Remote UE(s). In one embodiment, PDN connection(s) supporting UE-to-Network Relay are only be used for Remote ProSe UE(s) relay traffic. This relay feature is mainly for public safety use case in current 3GPP release.

FIG. 5 also shows the procedure of direct communication via ProSe UE-to-Network Relay 404 for a remote UE 402. In step 1, the ProSe UE-to-Network Relay 404 performs initial E-UTRAN Attach (if not already attached) and/or establishes a PDN connection for relaying (if no appropriate PDN connection for this relaying exists). In step 2, the Remote UE 402 performs discovery of a ProSe UE-to-Network Relay 404 using Model A or Model B discovery. In step 3, the Remote UE 402 selects a ProSe UE-to-Network Relay 404 and establishes a connection for One-to-one ProSe Direct Communication. If there is no PDN connection associated with the ProSe Relay UE ID or an additional PDN connection for relaying is needed, the ProSe UE-to-Network Relay initiates a new PDN connection establishment procedure for relaying. In step 4, IPv6 prefix or IPv4 address is allocated for the remote UE 402. From this point the uplink and downlink relaying can start.

In step 5, the ProSe UE-to-Network Relay 404 sends a Remote UE Report 402 (Remote User ID, IP info) message to the MME 502 for the PDN connection associated with the relay. The Remote User ID is an identity of the Remote UE user (provided via User Info) that was successfully connected in step 3. The MME 502 stores the Remote User IDs and the related IP info in the ProSe UE-to-Network Relay's EPS bearer context for the PDN connection associated with the relay.

In step 6, the MME 502 forwards the Remote UE Report message to the S-GW 504 and S-GW 504 forwards the message to the P-GW 506 of the UE-to-Network Relay UE 404. The MME 502 may report multiple Remote UEs in one Remote UE Report message.

According to another embodiment, Network Function Virtualization (NFV) aims to transform the way that network operators architect networks by evolving standard IT virtualization technology to consolidate many network equipment types onto industry standard high volume servers, switches and storage, which could be located in Data centers, Network Nodes and in the end user premises. It involves the implementation of network functions (e.g., mobility management, session management, QoS) in software that can run on a range of industry standard server hardware, and that can be moved to, or instantiated in, various locations in the network as required, without the need for installation of new equipment.

NFV is applicable to any data plane packet processing and control plane function in mobile and fixed networks. Potential examples may include:

(i) Switching elements: BNG, CG-NAT, routers.

(ii) Mobile network nodes: HLR/HSS, MME, SGSN, GGSN/PDN-GW, RNC, eNodeB.

(iii) Functions contained in home routers and set top boxes to create virtualized home environments.

(iv) Converged and network-wide functions: AAA servers, policy control and charging platforms.

(v) Application-level optimization: CDNs, Cache Servers, Load Balancers, Application Accelerators.

(vi) Security functions: Firewalls, virus scanners, intrusion detection systems, spam protection.

(vii) Application of NFV brings many benefits to network operators, contributing to a dramatic change in the telecommunications industry landscape. NFV could bring the following benefits:

(viii) Reduced equipment costs and reduced power consumption through consolidating equipment and exploiting the economies of scale of the IT industry.

(ix) Increased velocity of Time to Market by minimizing the typical network operator cycle of innovation.

(x) The possibility of running production, test and reference facilities on the same infrastructure provides much more efficient test and integration, reducing development costs and time to market.

(xi) Targeted service introduction based on geography or customer sets is possible. Services can be rapidly scaled up/down as required.

(xii) Enabling a wide variety of eco-systems and encouraging openness.

(xiii) Optimizing network configuration and/or topology in near real time based on the actual traffic/mobility patterns and service demand.

(xiv) Supporting multi-tenancy thereby allowing network operators to provide tailored services and connectivity for multiple users, applications or internal systems or other network operators, all co-existing on the same hardware with appropriate secure separation of administrative domains.

(xv) Reduced energy consumption by exploiting power management features in standard servers and storage, as well as workload consolidation and location optimization.

European Telecommunications Standards Institute (ETSI) has formed a specification group "Network Functions Virtualization" to publish some white papers, and to produce several more in-depth materials, including standard terminology definitions and use cases for NFV that act as references for vendors and operators considering implementing NFV. ETSI GS NFV 002, Network Functions Virtualization (NFV); Architectural Framework is an ETSI publication that establishes an Architectural Framework for applying NFV concepts to the Mobile Core Network.

Figure 6:
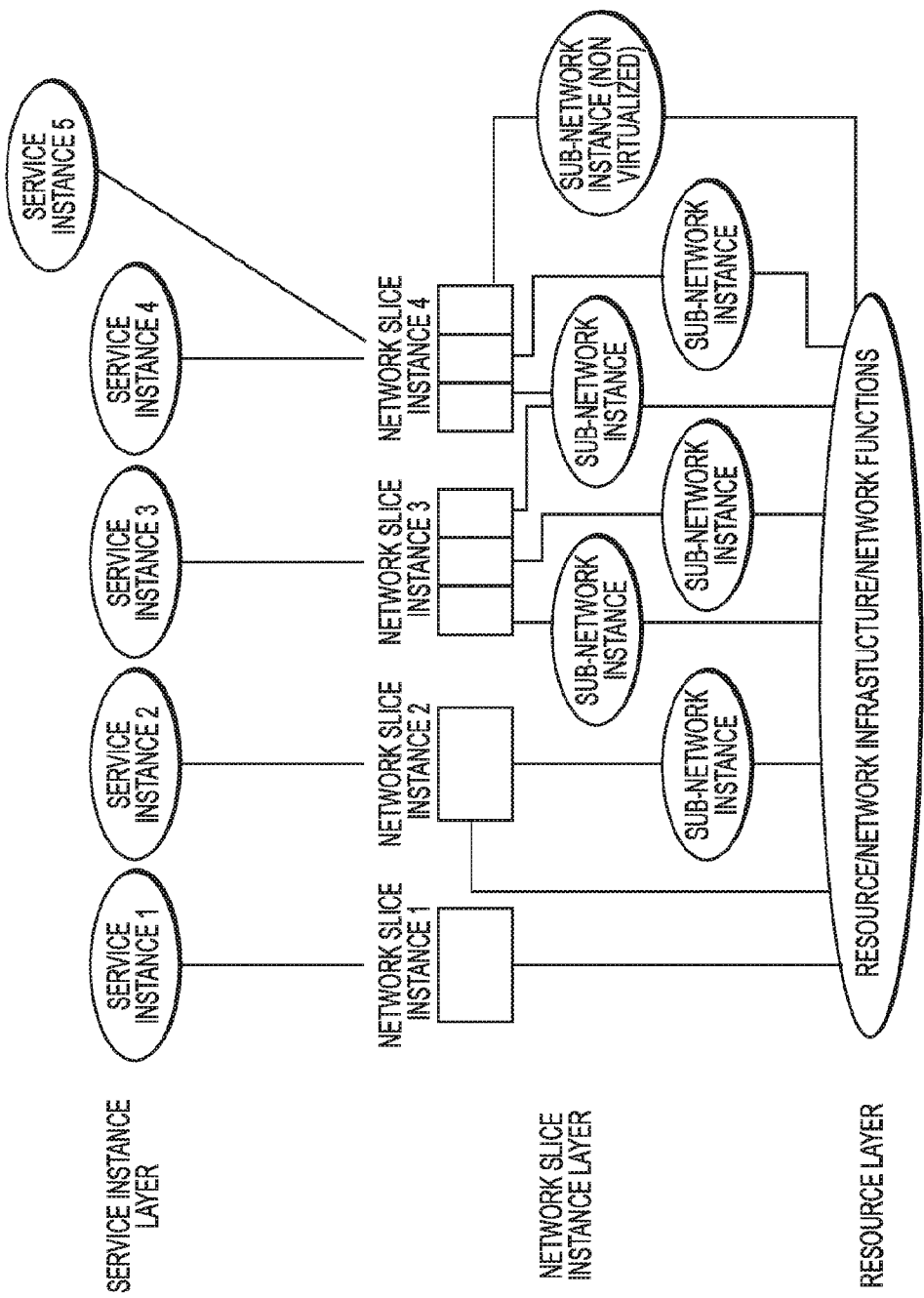
FIG. 6 is a diagram of a Network Slicing Conceptual Outline

Network Slicing, as described, for example, in NGMN Alliance, "Description of Network Slicing Concept," is a mechanism that could be used by mobile network operators to support multiple 'virtual' networks behind the air interface across the fixed part of the mobile operator's network, both backhaul and core network. This involves 'slicing' the network into multiple virtual networks to support different RANs or different service types running across a single RAN. Network slicing enables the operator to create networks customized to provide optimized solutions for different market scenarios which demands diverse requirements, e.g. in the areas of functionality, performance and isolation. FIG. 6 shows a conceptual architecture of network slicing.

A network slice instance is made up of a set of network functions and the resources to run these network functions. Different shades are used to indicate the different network slice instances or sub-network slice instances.

A sub-network slice instance comprises a set of network functions and resources to run those network functions, but is not in itself a complete logical network. A sub-network slice instance may be shared by multiple network slice instances 3GPP is designing a 5G network and is considering incorporate the network slicing technology. This technology is a good fit for the 5G network, because the 5G use cases (e.g., massive IoT, critical communications, and enhanced mobile broadband) demand very diverse and sometimes extreme requirements. The current pre-5G architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business needs when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Network slicing enables the operator to create networks customized to provide optimized solutions for different market scenarios which demand diverse requirements, e.g. in the areas of functionality, performance and isolation. However, there are some challenges and issues to support network slicing in the future 5G network:

(i) How to achieve isolation/separation between network slice instances and which levels and types of isolation/separation will be required;

(ii) How and what type of resource and network function sharing can be used between network slice instances;

(iii) How to enable a UE to simultaneously obtain services from one or more specific network slice instances of one operator;

(iv) What is within 3GPP scope with regards to Network Slicing (e.g. network slice creation/composition, modification, deletion);

(v) Which network functions may be included in a specific network slice instance, and which network functions are independent of network slices;

The procedure(s) for selection of a particular Network Slice for a UE;

(i) How to support Network Slicing Roaming scenarios;

(ii) How to enable operators to use the network slicing concept to efficiently support multiple 3rd parties (e.g. enterprises, service providers, content providers, etc.) that require similar network characteristics.

More details (i.e., issues, problems and possible solutions) can be found in 3GPP TR 23.799 about how 3GPP applies the network slicing in the 5G network architecture.

Figure 7:
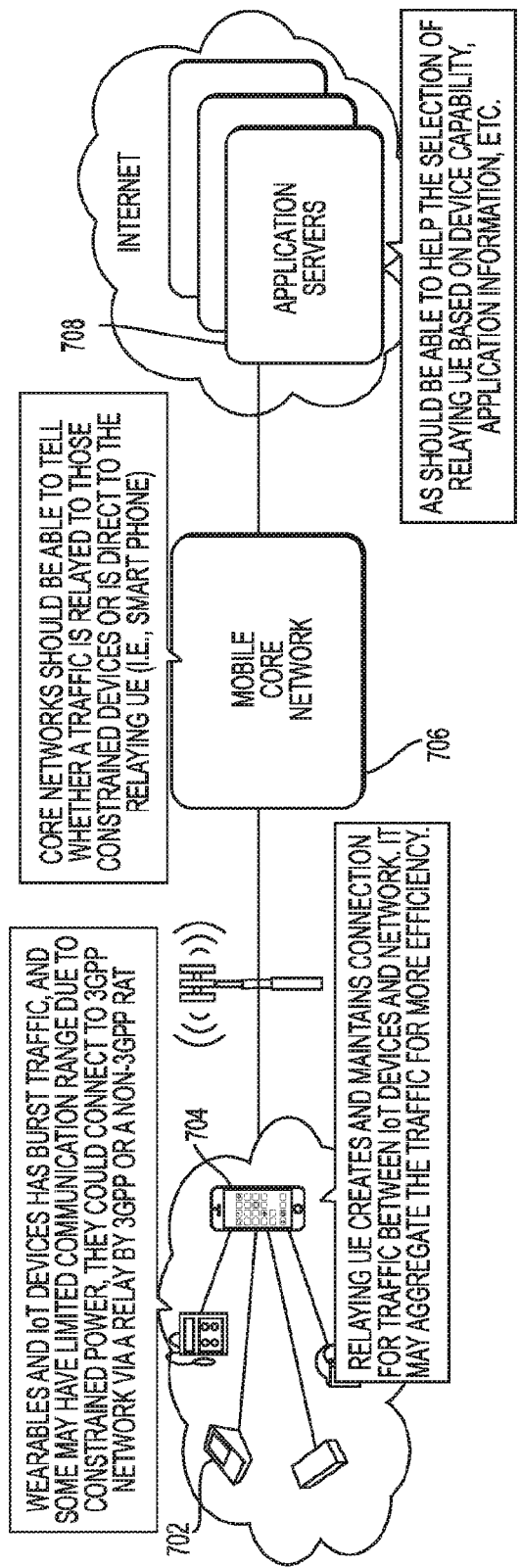
FIG. 7 is a diagram of a Use Case of Connection to 3GPP Network via Relay

According to an aspect, an exemplary deployment of IoT devices is shown in FIG. 7. Given the large number of IoT devices, the fact that they are typically power constrained, and that many devices will be deployed deep inside of building or basements, it will often be preferable for IoT devices to attach to the network as a remote UE 702 via a relay UE 704. Communicating via a relay node 704 allows the IoT device to use a limited transmission range. As a result, saving power and limiting the number of devices that need to communicate directly with the base station are realized.

When a remote UE 702 connects to a relay UE 704, the relay UE 704 needs to be configured to know whether the remote UE 702 is authorized to connect to the network, how the remote UE's traffic should be prioritized, how to determine where to send UL data from the remote UE 702, etc. This configuration can sometimes come from the remote UE 702 itself, but it may also need to come from the Core Network 706 and/or an Application Server 708 that has a relationship with the remote UE 702.

Remote UEs are often within range of multiple Relay UEs. It would sometimes be advantageous to allow the Core Network 706 or an Application Server 708 to direct the remote UE 702 to connect to the network directly or connect via different relay node. For example, a different relay node maybe more optimal if the different relay UE has a sleep cycle that is more closely aligned with the remote UE 702, if a different relay UE has more battery life, or if a different relay UE is already in communication with the application server communicating with the remote UE 702.

It may sometimes be inefficient for a relay UE 704 to establish and maintain separate sessions for every remote UE 702 that it is relaying for. Session management procedures are needed to enable the relay UE 704 to efficiently share sessions between remote UE's or send data even without establishing a session. Thus, two types of session management procedures are required: (i) procedures that allow the relay UE 704 to send data without establishing a session (this type would be well suited to sending and receiving small data packets); and (ii) procedures that allow the relay UE 704 to send and receive data related to multiple UE's on the same session.

The relay UE 704 and remote UE 702 may belong to different subscribers. For example, a relay UE 704 inside of a vehicle may relay traffic for guest passengers that are in the vehicle. In such a scenario, it is important for the core network to be able to differentiate between traffic that was originated by the remote UE 702 and traffic that was originated in the relay UE 704. The core network needs to be able to differentiate not only between regular UE traffic and relayed UE, but it must also be able to determine what subscriber is associated with the relayed traffic. This determination is needed so that the core network can charge the appropriate subscriber for the traffic and possibly compensate the relay UE 704 for facilitating the connection.

It is assumed, in at least one or more embodiments in this application that the remote UE 702 has a 3GPP subscription and uses a 3GPP defined radio to communicate with the relay UE. However, the remote UE 702 may use a non-3GPP Radio (e.g., WiFi) to communicate with its associated relay UE. It is envisaged that the NF and/or SCS/AS involved and discussed in the application may also stay in a local network. Meanwhile, the included messages and information are the same as the scenario in that NF is in the CN and SCS/AS connects to the CN.

3rd Party Assisted Relay Configuration

A Relay Management Network Function (RM-NF) 802 is described. The RM-NF 802 is responsible for assigning a UE to serve as a relay UE and assigning remote UE's to a relay UE. The RM-NF 802 may be a standalone NF or its functionality may be integrated with another NF such as an MM NF (e.g., AMF 172) or an SM NF (e.g., SMF 174).

The description below highlights the ideas on how the RM-NF 802 coordinates with SCS/AS 808 for determining and configuring the relay UE to better serve the remote UEs, this could be triggered by the following cases:

When a UE that is capable of being a relay UE attaches to the network or moves, the CN needs to determine if this UE could be used as a relay. This determination may be made via communication between NF's and/or between NF's and an AS. The procedure is exemplarily illustrated in FIG. 8.

When a remote UE 702 attaches to the network via a relay UE 704, CN may sometimes determine that another UE is better suited to serve as the relay UE. For example, this may be determined based on mobility, the availability of other access points (non-3GPP access points or other types of access points). This determination may be made via communication between NF's and/or between NF's and an AS. The procedure for this scenario is covered by the call flows shown in FIG. 8.

Figure 8:
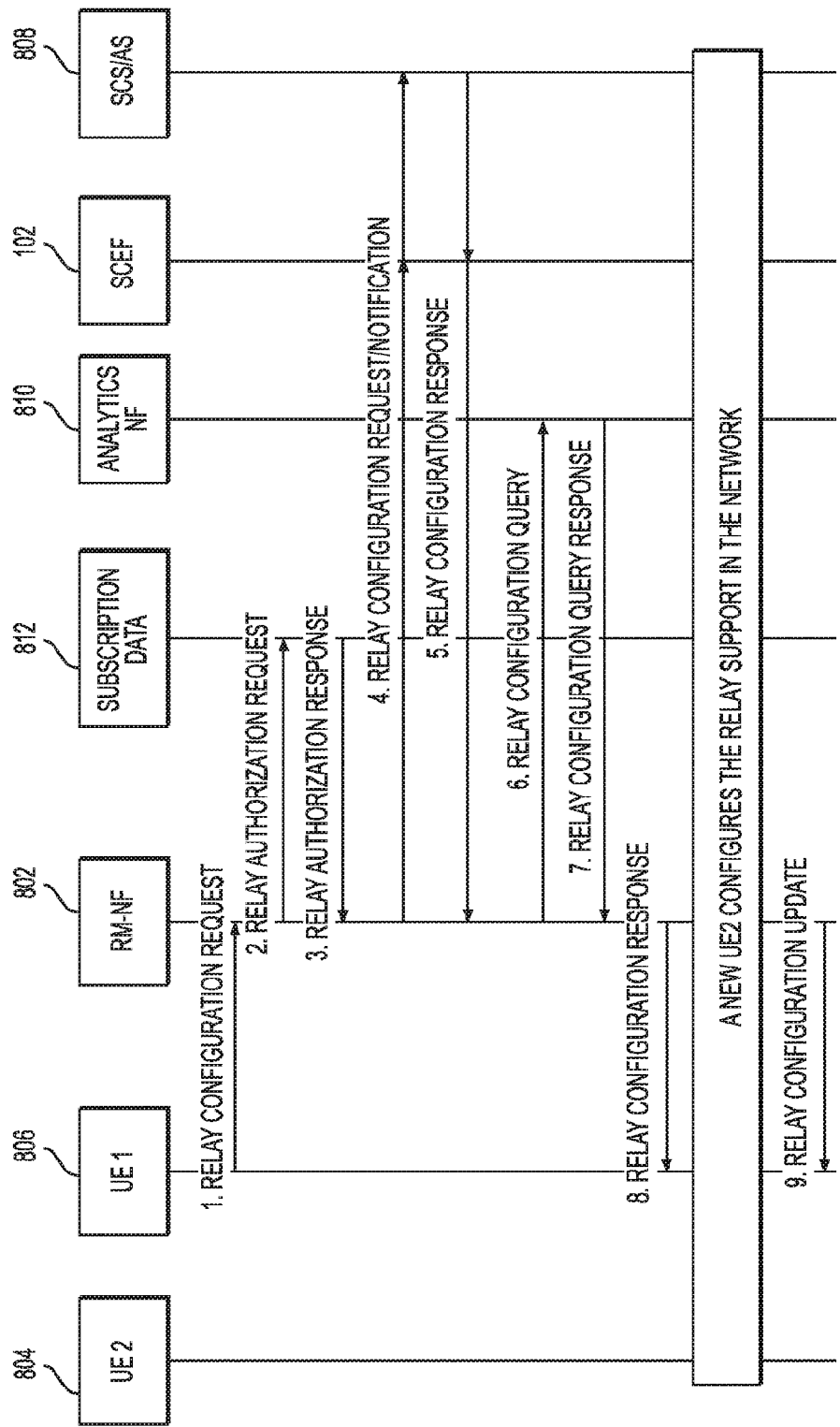
FIG. 8 is a diagram of a Procedure of Relay Configuration with Assistance from SCS/AS FIG. 9 is a diagram of a Procedure of Relaying UL non-Frequent Small Data for Remote UE via CP

FIG. 8 shows how a UE coordinates with the CN and SCS/AS 808 for configuring relay support in case 1 with the following steps:

Step 1 of FIG. 8 (Optional): A UE 806 sends a relay configuration request to the Core Network. This request is used to identify UE's capability and willingness to serve as a relay and/or to register/authorize for using the relay service as a remote UE 702 in the future. This message may be sent directly to the RM-NF 802 or it may be sent to another NF (for example the CNEP, MM NF or SM NF) which forwards the relay related information to the RM-NF 802 after finding that the UE 806 is authorized to serve as a relay UE. FIG. 8 depicts the scenario where the information is sent directly to the RM-NF 802 and stored in the CN. The information of being a relay or a remote UE 702 in this message may be the following:

(i) A third party identifier. The third party identifier may indicate a third party that is associated with the UE device. This association may be used to determine what UEs the Relay UE is allowed to relay for. The third party identifier may resolve to an AS/AF/SCS 808 that is owned, controlled or managed by the third party. The third party identifier may be a MAC identifier, a device serial number, an external group identifier or an IMSI-Group Identifier.

(ii) Relay capable indication: indicates if UE1 806 is capable of relaying any data between network and a remote UE 702.

(iii) Service area information as a relay: indicates a geographic area that the UE1 806 could act as a relay. In other words, UE1 806 could relay the data only within the area. For example, UE1 806 only be able to serve as a relay for the devices within a house, or UE1 806 only relays traffic for the devices within 20 feet around itself.

(iv) Relay schedule: indicates the time schedule that UE1 806 may act as a relay. Out of the time slots, the UE1 806 may not be able to or not willing to serve as a relay. For example, UE1 806 is only able to relay data during night time when it is relatively idle.

(v) Relay load restriction: indicates the traffic level that the relay UE can relay. For example, a relay UE may indicate that it can relay traffic for at most 5 devices, or when the relay UE's data rate is below a certain threshold.

(vi) Service requirement for a potential remote UE 702: indicates some restrictions or requirements for a potential remote UE 702 when the remote UE 702 tries to connect network via UE1 806. For example, UE1 806 could do the relaying for devices that are power constrained, stationary, requiring low data rate or not delay sensitive. Or UE1 806 could relay the data for devices that have 3GPP subscription using 3GPP radio.

(vii) Relay service authorization indication: indicates UE1 806 may need to connect to the network as a remote UE 702 in the future. In other words, UE1 806 wants to be authorized by network to use the relay service to connect the network.

(viii) Location information as a remote device: indicates the geographic information where UE1 806 may need a relay UE to connect to the network.

(ix) Application information: contains some information about applications which UE1 806 is able to act as a relay for, and which UE1 806 may need to use the relay service for.

(x) SCS/AS ID: identifies the SCS/AS 808 that the server UE1 806 is associated with. The SCS/AS 808 may be queried by a NF to check how the UE should be configured.

(xi) Type of data: IP, NIDD, or both. Optionally with a priority for each type. Optionally also a direction, i.e. UL, DL, or both, per data type.

(xii) Indicator to indicate whether or not the UE can relay data for devices that belong to a different subscriber and/or Public Land Mobile Network (PLMN).

(xiii) Reliability indicator: for UE that wants to be a remote UE 702, this indicates if the UE wants an acknowledgement after the data is successfully delivered to SCEF 102. For UE that is configured as a relay, this indicates if the UE can provide/support this reliability service for the remote UE 702.

(xiv) Reliability mode: this indicate if the reliability service is done by an end-to-end way (SCEF 102 sends ack directly to the remote UE 702) or a hop by hop way (SCEF-MME-relay UE-remote UE). The relay configuration request could be sent together with other control message, such as an attach request, TAU request, MM message, or SM message.

The information described above may be used to determine the status of the UE as a relay and/or as a remote. For example, "Service area information as a relay" is used to configure the relay support for UE1 806 acting as a relay; "Location information as a remote device" is used to configure relay support for UE1 which acts as a remote UE 702; "Application information" could be used for both relay and remote UE 702 for UE1.

Step 2 of FIG. 8: As a result of receiving the message in step 1, the RM-NF 802 queries the subscriber data base (e.g., UDM 178) to determine if the UE1 806 is authorized to serve as a relay UE and to check what remote UE(s) UE1 806 is authorized to relay for. The query may indicate the UE's location, either physical location such as a specific cell/service area or relatively location such as distance from UE1 806.

This message may be triggered by events other than receiving the message of step 1. For example, this message could be triggered by receiving a notification from another NF. The indication from the other NF may indicate that the UE or another UE has attached or moved to a certain location.

Step 3 of FIG. 8: The subscriber data base (e.g., UDM 178) replies with an indication of whether or not the UE1 806 is authorized to serve as a relay UE. The reply may also provide the capabilities that were listed in step 1 so that the UE1 806 does not need to provide them. The authorization indication may be based on the location that was provided in the request. For example, some UE's may only be authorized to serve as a relay UE when in a certain location such as a building. SCS/AS ID may also be included and returned to RM-NF 802 to indicate which SCS/AS RM-NF 802 should contact to further configure the relay support for UE1 806.

Step 4 of FIG. 8: The RM-NF 802 contacts that SCS/AS 808 according to the third party identifier that was included in the UE1's configuration request to determine what AS to notify and request information from. This message serves as an indication to the AS that the UE1 is attached with its current location, and/or that the UE1 806 is willing to serve as a relay for a certain application AS supports. The ID of RM-NF 802 is also included in the message to SCS/AS 808 so that SCEF 102 or NEF in the context of 5G and SCS/AS 808 could return feedback to RM-NF 802 later.

Step 5 of FIG. 8: The AS replies with some or all of the following information.

(i) Relay recommendation indication: indicates if the AS wants the UE1 806 to act as a relay for applications/services it provides through the network.

(ii) Relay schedule: indicates in which time period (e.g., weekend, evening of each day) SCS/AS 808 expects UE1 806 to work as a relay.

(iii) List of applications/services: indicates a list of applications/services provided by SCS/AS 808 which UE1 806 will relay traffic for. In other words, the sponsor (i.e., application/service provider) may specify a list of applications/services that could be relayed. Traffic of other applications/services cannot be relayed, e.g., some sensitive personal data cannot be relayed.

(iv) QoS related requirements: indicates some QoS parameters as requirement for the relay. For example, if UE1 806 is to relay UL traffic for a video streaming application to AS, the data rates should be more than 10 Mbps.

(v) Policy of accepting remote UE 702: indicates some policies that should be followed when UE1 806 accepts a remote UE 702 and relay the traffic to AS. For example, AS could require UE1 806 to do the relay only for a remote UE 702 that already registers with the AS, or is using 3GPP radio access, or premium subscriber of its service.

(vi) Charging method: indicates the charging method for the relaying traffic. For example, AS would pay for the relay traffic for a certain application if remote UE 702 is not attached to the network, or remote UE 702 has to pay itself before it uses the relay to communicate with CN and AS. UE1 806 may get some free data (i.e., AS pays) if UE1 does the relay for a certain number of remote UEs or relay a certain amount of data/transactions.

(vii) List of UE IDs: indicates a list of UEs that are already configured as relay UE or remote UE 702 connected to the SCS/AS 808 for certain applications/services. In addition, the AS 808 may return some application layer authorization token per UE ID, so that when for example a remote UE 702 tries to use the relay UE, then the remote UE 702 can provide the authorization token that the relay UE already has and verifies against it.

(viii) Coverage Enhancements Request: Since the UE is being enabled to serve as a relay, the SCS/AS 808 may desire to enable coverage enhancements for the UE to help ensure better coverage for the remote UE 702.

(ix) Data type: IP, non IP, both. Direction of relay i.e. UL, DL, or both. Indicator to indicate whether or not a relay UE can relay data for devices that belong to a different subscriber and/or PLMN.

Step 6 of FIG. 8: In addition to contact SCS/AS 808, the RM-NF 802 may also query an analytics NF in the network to make better decision on relay configuration. Alternatively, RM-NF 802 may subscribe any statistic update at the analytics NF about a particular relay UE or a list of UEs that are configured as relay within a service area. So that RM-NF 802 may be notified when any change is made at the analytics NF regarding the relay configuration. The analytics NF 810 may maintain some statistics information about UE1 806, such as the following information:

(i) Mobility behavior of UE1 806, e.g., for time period of each day/week, UE1 806 stays within a certain service area.

(ii) Battery usage and charging behavior of UE1 806, e.g., usually UE1 806 is fully charged in the morning every day, and battery level is low for relaying from late afternoon.

(iii) Application statistic information, e.g., UE1 806 usually streams video in the evening, and remains idle in most of the work time in the morning.

Step 7 of FIG. 8: Analytics NF 810 replies RM-NF 802 with requested information described in step 6. Alternatively, steps 6 and 7 could target a policy engine and the policy that is generated by the policy engine may be based on information that was obtained from the Analytics NF 810.

Step 8 of FIG. 8: The relay configuration is passed to the UE. This information may be carried in an attach reply, TAU reply, SM message reply, etc. This message may carry the following information.

(i) Relay permit indication: indicates if UE1 806 is permitted to relay any traffic.

(ii) Relay service registration indication: indicates if UE1 806 could use relay service when it is necessary, e.g., UE1 806 moves out of range, and needs to communicate with network and SCS/AS 808 as a remote UE 702.

(iii) Application list: indicates a list of applications and/or services which UE1 806 could relay traffic for, or which UE1's traffic could be relayed for.

(iv) Relay schedule: similar content as that described in step 5.

(v) Relay policy and charging configuration: indicates a set of policy and charging method for relay, which is similar to the information described in step 5.

(vi) Whether an explicit ACK is needed for delivery report between remote and relay UE (vii) Requirement on the data security e.g. remote UE security is applied at application layer only, or relay UE applies security only, or both.

Step 9 of FIG. 8: Once a new UE2 804 comes in and completes its configuration of relay support, the RM-NF 802 may notify the old UE1 806 that there is an update of its relay configuration by sending the relay configuration update message. For example, RM-NF 802 could change the relay schedule of UE1 806, so that UE1 806 and UE2 804 could split the relay workload, or UE1 806 stops relaying traffic for some applications, while UE2 804 relays for those applications. Even more, UE1 806 may fully stop the relay work since UE2 804 has more power and resources for relaying. The message may contain the information mentioned in above steps to change the relay configuration at UE1 806. The configuration can modify any of the information previously sent in step 8, i.e., add new information, and delete information of change the value of specific information or configurations. E.g. a relay UE may be updated such that it relays Non-IP Data Delivery (NIDD) and not both NIDD and IP traffic.

It is envisaged according to this application that the RM-NF 802 may assign multiple UEs to serve as relay for the same UE. For example, in a home, a smart phone and a tablet could be configured as the available relay, so that any constrained IoT device within the home could connect to CN via either device.

In addition, SCS/AS 808 may subscribe the RM-NF 802 event that a new relay UE is configured or the configuration of a relay UE is changed, e.g. applications and services it provides, so that it will be notified by CN when such event takes place.

Similarly, there could be a procedure for a relay UE to notify CN entity (e.g., AMF 172 and SMF 174) that it will not act as a relay, so that RM-NF 802 will contact the subscription database 812 (e.g., UDM 178) to update the relay configuration, and SCS/AS 808 may be notified as well.

Session Management for Relaying Non-Frequent Small Data

According to another aspect of the application, constrained IoT devices may generate bursty, small data (either IP or non-IP). For more efficient transfer of those non-frequent small data, it is expected to send those data without introducing much control signaling compared with the amount of data delivered. Mechanisms are described for efficiently transferring/relaying small data over the CN to the SCS/AS 808.

The following scenarios are envisaged regarding how to transfer the non-frequent small data (IP or non-IP) for a remote UE 702 assuming that the remote UE 702 is NOT attached to the network but already connects to the relay UE:

(i) If relay UE has already attached to the network but UP path is not setup, i.e., CP path (e.g., MME-SCEF in EPC, or AMF/SMF-NEF in 5G) is established, and the remote UE 702 is not attached to network, i.e., CN does not have any information about the remote UE 702.

(iia) Relay UE transfers the data combined with the identity information of the remote UE 702 through its CP path to the targeted SCS/AS 808, or (iib) Relay UE setups a new session, then the relay UE sends the data over this session.

(iii) If relay UE has not attached to the network, the relay UE may perform the following operation depending on the operator's policy and/or configuration:

(iv) Relay UE may first attach to the network, and then follow the methods illustrated in above scenario to transfer the data.

(v) Relay UE directly sends data to CN by encapsulating data as well as identity information of its own and remote UE 702. NF in CN will process the data and forward to the targeted PDN. This mechanism may require RAN to have some selection functionality since relay UE is not attached to CN and RAN needs to select appropriate NFs to forward the data to the target AS.

For DL small data, AS and CN could re-use the path used to transfer the UL small data if possible, especially when remote UE 702 is not attached to CN, but the data is transferred through CP of relay UE, CN and AS could store this information to reach the remote UE 702 in the future.

Method of Relaying UL Data with Relay UE Attached to CN

Figure 9:
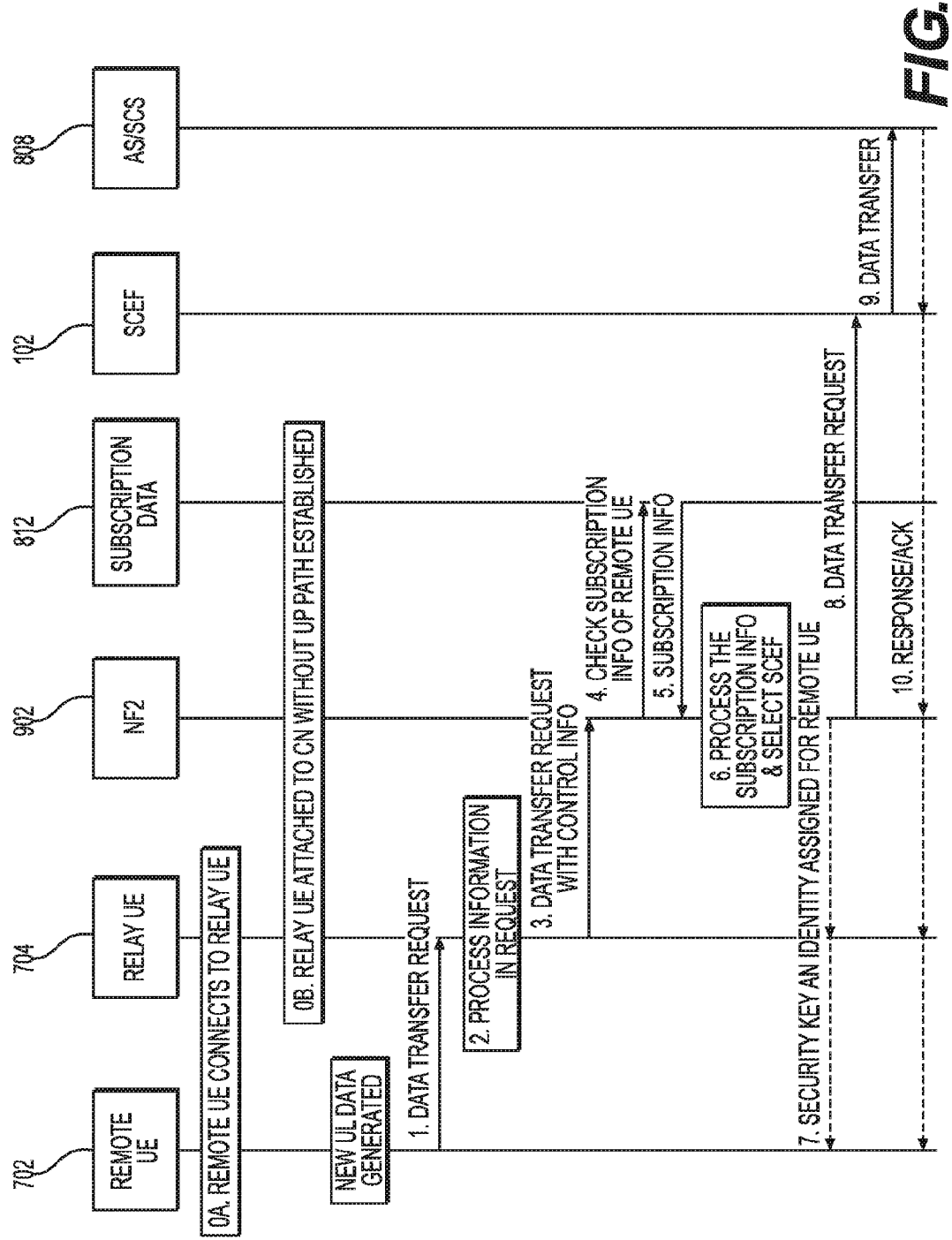

According to another aspect of the application, FIG. 9 shows how the UL non-frequent small data is transferred to the SCS/AS 808 for the remote UE 702 via the CP path established for the relay UE. It is assumed that there is a communication link between remote UE 702 and relay UE 704 regardless of types of link, e.g., Bluetooth, WiFi or 3GPP LTE (e.g. PC5 link).

Step 0 of FIG. 9: this is a pre-configured step, where the relay UE 704 has attached to the CN, and has the CP path established. In addition, remote UE 702 connects to the relay UE 704.

Step 1 of FIG. 9: once there is a new UL traffic generated at the remote UE 702, remote UE 702 sends the data transfer request message to the relay UE 704, which includes the following control information as well as data. The data and/or all of the control information may be encrypted by the remote UE 702. However, the external Identifier may not be encrypted so that the core network may determine the identity of the Remote UE 702 and decrypt the data.

(i) Application ID.

(ii) Destination ID: May be an SCS/AS ID a UE Identifier or a network slice (instance) information.

(iii) Data Network Identifier: The DN that should be used to reach the destination.

(iv) Subscription identify of remote UE 702.

(v) External ID of Remote UE 702.

(vi) QoS requirements of the UL traffic.

(vii) Attach indication: indicates if remote UE 702 wants to attach to the network during the UL data transfer process.

(viii) Remote UE Electronic Signature. The Core Network will use this electronic signature and the external identifier to determine and authenticate the identity of the remote UE 702. This will allow the CN to charge the remote UE 702 for the traffic.

Step 2 of FIG. 9: Once relay UE 704 receives the request message, it processes the request message with control information of remote UE 702 and the UL data.

Step 3 of FIG. 9: since remote UE 702 is not attached to network, relay UE 704 tries to send the message through its CP path, or route the message based on the policies received previously from the network, e.g. non-IP data goes on CP, etc. In addition to information described in step 1, relay UE 704 will insert the following information to the data transfer request message:

(i) Subscription identification of relay UE 704.

(ii) External Identifier of the Relay UE 704.

(iii) Information of link between remote UE 702 and relay UE 704.

(iv) Identification of NF that is the destination of the message.

(v) Relay UE Electronic Signature. The Core Network will use this electronic signature and the external identifier of the relay UE 704 to determine and authenticate the identity of the relay UE 704. This will allow the CN to charge the relay UE 704 for the traffic.

Steps 4-5 of FIG. 9: NF2 902, which is responsible for handling the control signaling of relay UE 704, communicates with data base for subscription information of the remote UE 702 based on the identification information provided in step 1. Subscription database 812 may return the identity of remote UE 702 if it attached to network before, or some new identity (e.g., GUTI) assigned to remote UE 702. In addition, the SCEF ID may be returned as well so that NF2 902 knows where to forward the UL data to reach the SCS/AS 808. Step 4 may include the remote UE's external identifier, digital signature, and a hash of some or all of the payload or control data from the remote UE 702. The Reply of step 5 may include an indication of whether or not the remote UE 702 has been authenticated and authorized. The reply may also include the UE's subscription identifier and a charging reference number. The reply from the subscriber data base may include the identity of where the message from the remote UE 702 should be sent. For example, it may include a data plane anchor that the message should be sent towards.

In this embodiment, the NF2 902 may contact the RM-NF 802 to verify the relay configuration of relay UE 704 once receiving the data transfer request.

Step 6 of FIG. 9: NF2 902 processes the received information, and may optionally calculate some new identity and security key for the remote UE 702. If remote UE 702 wants to attach to the network as indicated in step 1, NF2 902 creates and maintains the attachment status for the remote UE 702 in this step.

Step 7 of FIG. 9: optionally, NF2 902 returns some control information to the remote UE 702, such as identification information and security key obtained in steps 5 and 6 and an indication of whether or not the remote UE 702 was authenticated and authorized.

Steps 8-10 of FIG. 9: the data is transferred to the targeted SCS/AS 808 through SCEF 102 selected by the NF2 902. Alternatively, if a data network (DN) identifier was provided by the remote UE 702 or relay UE 704, the data may be transferred towards a data plane anchor and then towards the destination.

It is envisaged that if the acknowledgement for data transfer is setup as end-to-end, then the SCEF 102 will send the acknowledgement in step 10; otherwise, the acknowledgement will sent in a hop by hop manner, i.e., relay UE sends acknowledgement to remote UE after step 1, NF2 sends acknowledgement to relay UE after step 3, SCEF 102 sends acknowledgement to NF2 after step 8.

In the context of 5G, NF2 may be AMF 172, which serves the entry point for RAN 173 to communicate with 5G core network 170, or SMF 174 which is responsible for managing the PDU session within the core network. In case that NF2 is SMF 174, AMF 172 will be involved by forwarding the information between RAN 173 node and SMF 174.

Figure 10:
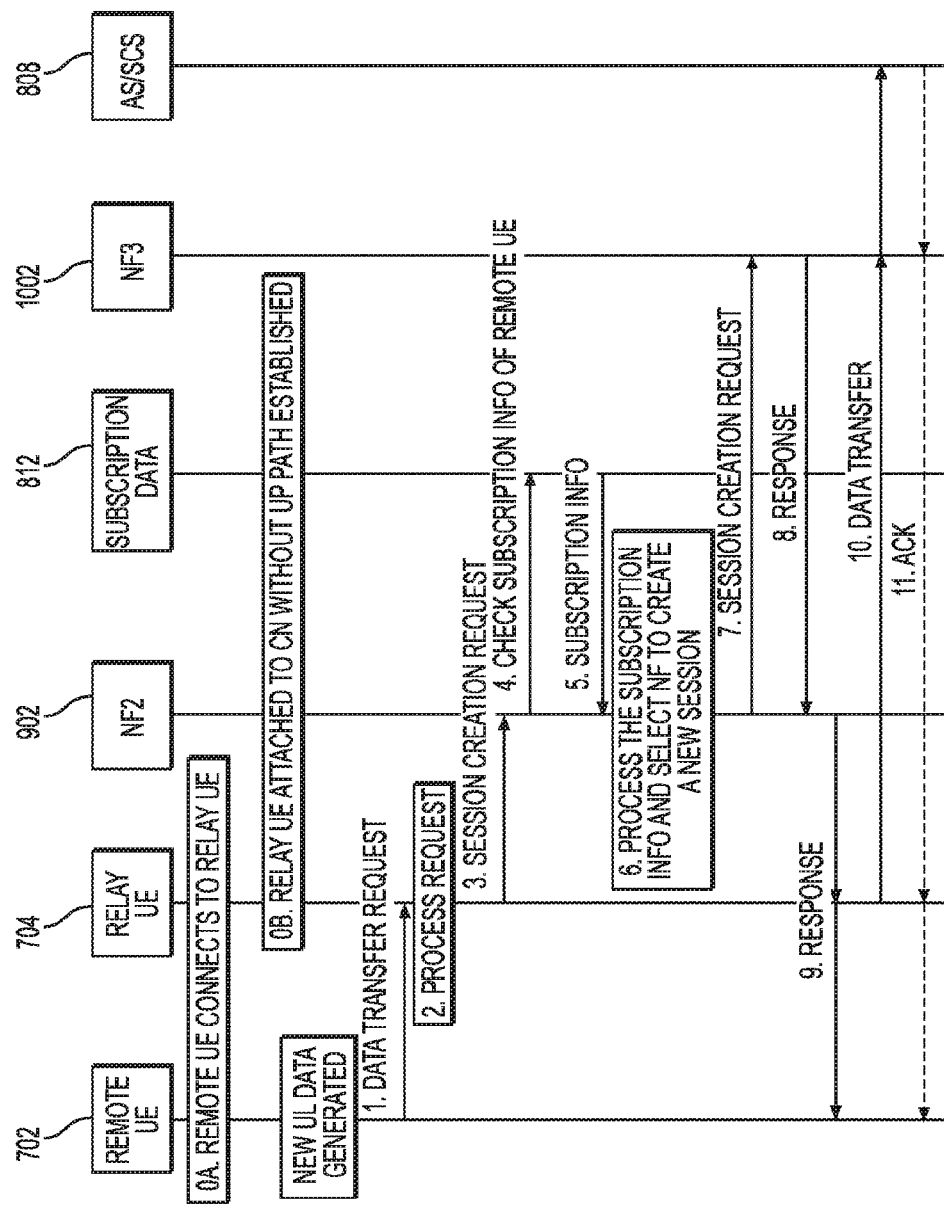
FIG. 10 is a diagram of a Procedure of Relaying UL non-Frequent Small Data for Remote UE by Creating a New Session

FIG. 10 shows the detailed steps that the relay UE 704 setups a session before relaying the data for the remote UE 702 over the session to the targeted SCA/AS.

Steps 0-2 of FIG. 10: these steps are the same as steps 0-2 in FIG. 9. During the connection establishment process (step 0a), the remote UE 702 and relay UE 704 may indicate if they support IP data only, non-IP data, or both.

Step 3 of FIG. 10: relay UE 704 decides to create a session to transfer the UL traffic for the remote UE 702, therefore it sends a session create request message to NF2 902, which may include the following information:
(i) Session type: IP or non-IP.
(ii) Connection type: connection-less or connection oriented.
(iii) Indicate if the session is used only for remote UE 702 or relay UE 704 can also transfer its own data over the session.
(iv) Indicate if the session is dedicated to the remote UE 702 or shared by multiple remote UEs.
(v) Indicate if the session is for UL data only or for both UL and DL data.

Steps 4-5 of FIG. 10: these steps are the same as steps 4-5 in FIG. 9.

Step 6 of FIG. 10: NF2 902 will process the subscription information. If the relay UE 704 or remote UE 702 indicates that they want to establish a session for relaying the traffic, NF2 902 needs to select a NF to set up the session first based on information from the relay UE 704, remote UE 702 and subscription information. Some example criteria could be as follows:
(i) Location of the NF for session setup.
(ii) NF that is able to manage the expected type of session Step 7 of FIG. 10: NF2 902 sends session creation request message to the selected NF3. 1002. The message may contain the following information:
(i) Type of the session: indicates if the session is connection-less or connection oriented, and if the session is IP based or non-IP based. If it is connection-less session, the NF3 1002 may not keep most session related contexts (e.g., QoS information, ID of tunnel ends) except the session ID.
(ii) Usage scope of the session: indicates if the session is dedicated to a specific remote UE 702, or dedicated to a group of remote UEs associated with the same relay UE 704, or shared by remote UE(s) and relay UE 704.
(iii) Traffic direction: indicates if the session is used to transfer UL traffic only, DL traffic only, or both.
(iv) The active duration of the session: indicates how long this session is active for transferring the data. For example, the session may be deactivated right after the remote UE 702 is leaving, or maintained as long as the relay UE 704 is attached to the network and acts as a relay.
(v) QoS requirement of the session: indicates some QoS requirements that the session could provide.
(vi) Multiplexing option: indicates if the session supports multiplexing. A multiplexing session may have different meanings:
(1) A session may connect to multiple SCS/AS 808 for the same UE.
(2) A session may contain separate connections internally between the same SCS/AS 808 and UE, and each individual connection may be per application.

Steps 8-9 of FIG. 10: the session information is returned to NF2 902, relay UE 704 and optionally remote UE 702.

Steps 10-11 of FIG. 10: relay UE 704 sends the UL traffic to the NF3 1002 which further forward to the SCS/AS 808.

It is envisaged that the remote UE 702 may not be aware of the existence of the session. In other words, only relay UE 704 knows that a session is created to relay traffic to one or more SCS/AS 808, in which case remote UE 702 cares only about how to connect to the relay UE 704.

In the context of 5G, NF2 may be AMF 172, which serves the entry point for RAN 173 to communicate with 5G core network 170, or SMF 174 which is responsible for managing the PDU session within the core network. In case that NF2 is SMF 174, AMF 172 will be involved by forwarding the information between RAN 173 node and SMF 174.

NF3 1002 may be a data plane anchor, such as P-GW, or SMS-SC, or UPF 176/NEF in 5G terms.

Method of Relaying UL Data without Relay UE Attached to CN

According to another aspect of the application, neither remote UE 702 nor relay UE 704 have been attached to the network, therefore CN does not have any information and context about them except that HSS contains some subscription information.

Since even relay UE 704 is not attached, CN has no information about relay UE 704 and remote UE 702. When RAN gets the data from relay UE 704, RAN needs to determine where (which CN NF) to forward the data, such as the selected CN NF could either direct forward the data towards the AS or set up a session to forward the data. The Relay UE 704 can directly sends packet to the RAN, which first checks the identity of relay UE 704 and then selects the CN function for handling the packet sent from relay UE 704. The packet includes the data from remote UE 702 as well as the control information of both remote and relay UE such as identity information.

Method of Relaying DL Data

According to yet another aspect of the application, FIGS. 9 and 10 focus on transferring UL data. Regarding the mechanism of relaying DL data from SCS/AS 808 to the remote UE 702, there are two cases:

There was already some UL traffic delivered from the remote UE 702 to SCS/AS 808 or to a Data Network. Therefore, some network entities (e.g., NEF, SCEF 102, NF2 902 and NF3 1002 in FIG. 10) may know how to reach the remote UE 702 to deliver the DL data.

There is no data transfer from source SCS/AS 808 to the targeted remote UE 702. This is a more complex scenario, where network entities may need to discover the route and then forward the DL data, sometimes the remote UE 702 may need to be triggered first.

This embodiment focuses on the second scenario since the method for the first scenario is straightforward, and network entities need to store the information when delivering the UL data. This information is described in FIG. 9 and FIG. 10, such as NF identity, PDU session ID and ID of relay UE 704.

In addition, for the first scenario, the remote UE 702 may have provided an indicator, when configuring its relay support that it expects to be connected via the same RN for some time, so that CN knows how to reach this remote UE 702. The UE may indicate this based on its expected mobility and may indicate an associate time duration. The Core network may store this information and use it first for targeting the remote UE 702, before proceeding to the second scenario.

Figure 11:
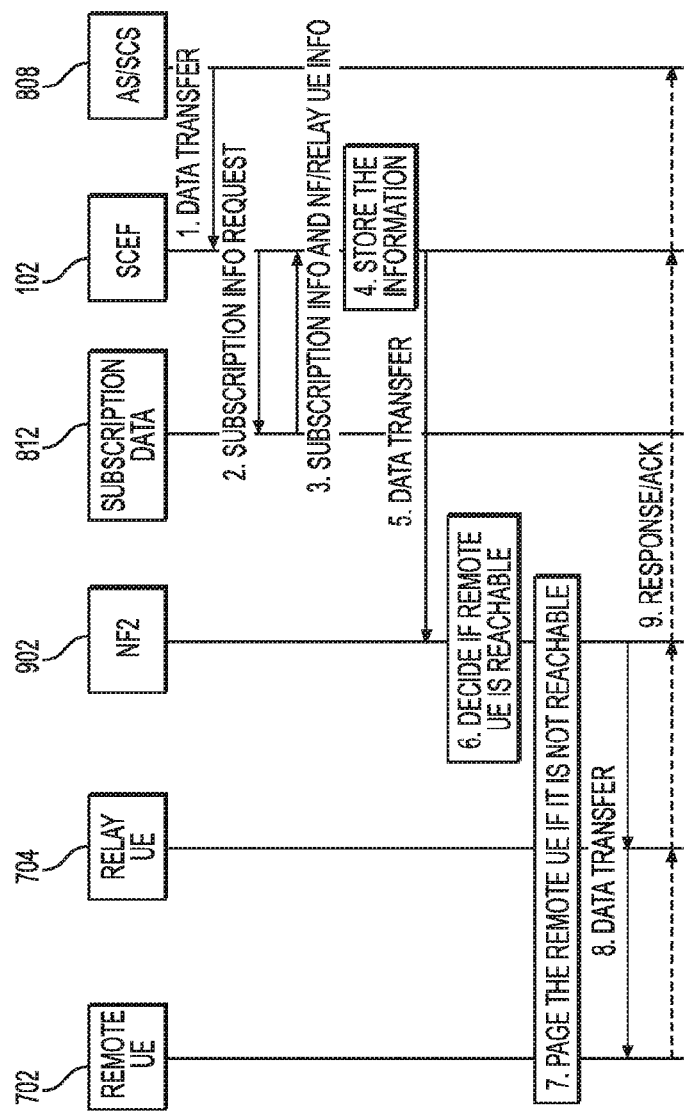
FIG. 11 is a diagram of a Procedure of Relaying DL Small Data to Remote UE via CP

FIG. 11 shows the procedure of forwarding DL data to a remote UE 702 via CP, assuming that SCEF 102 does not know which NF and relay UE 704 it should contact to reach the remote UE 702. Therefore, in step 2, SCEF 102 sends query to subscription data base 812 to obtain these information. Step 7 may be skipped if NF2 902 finds out the remote UE 702 is reachable.

Step 1 of FIG. 11: SCS/AS 808 sends the DL data to the SCEF 102, which is responsible to determine where to forward the data to reach the targeted remote UE 702. In the message, the SCS/AS 808 may provide the following information:

(i) External ID of the remote UE 702.
(ii) PDU session ID used to transfer the data.
(iii) 3GPP subscription information of the remote UE 702.

According to an embodiment, the SCS/AS 808 knows the address of SCEF 102 through pre-configuration, or could perform some discovery process to find the address to reach the SCEF 102.

Steps 2-3 of FIG. 11: in order to determine the NF to forward the DL data, SCEF 102 contacts subscription database 812 using the information obtained from SCS/AS 808. This is because this scenario assumes that remote UE 702 is not attached to network, and there is no UL traffic transferred from the remote UE 702 before. Network entities such as SECF need to find out which NF is serving the remote UE 702 and corresponding relay UE 704 first. If SCEF 102 knows which NF it should forward data to, steps 2 and 3 could be skipped. This could be done through previous UL data transfer.

Step 4 of FIG. 11: SCEF 102 stores the subscription information as well as the session information obtained from the subscription database 812, so that it does not need to query the subscription database 812 in the future to reach the same remote UE 702.

Step 5 of FIG. 11: SCEF 102 forwards the data to the NF2 902 in the CP of the relay UE 704.

Step 6 of FIG. 11: the NF2 902 decides if the relay UE 704 or remote UE 702 is reachable, it not, the NF2 902 may initiate the paging process or triggering process to get UE reachable.

Step 7 of FIG. 11: this is to page or trigger the relay UE 704 or remote UE 702, so that they can receive the DL data. There are several scenarios and ways to do this:

(i) NF2 902 pages or triggers the relay UE 704, which is not reachable, and indicates to the relay UE 704 that there are some DL data targeted to the remote UE 702 which is associated with it. And then relay UE 704 will contact the remote UE 702, which may or may not be within the scope of NF2 902. In this way, NF2 902 may buffer the DL data since the remote UE 702 is not reachable due to the power saving mode or eDRX.

(ii) NF2 902 directly pages or triggers the remote UE 702, and indicates that there are some DL data destined to it, and ask the remote UE 702 to contact its associated relay UE 704.

Step 8 of FIG. 11: NF2 902 sends DL to relay UE 704, which forwards to the remote UE 702.

Step 9 of FIG. 11: for acknowledgement process, relay UE 704 may send acknowledgement after it successfully receive the data from NF2 902, or alternatively, it waits until a certain time and sends acknowledgement to NF2 902 when remote UE 702 acknowledges the delivery.

In the context of 5G, NF2 could be AMF 172, which serves the entry point for RAN 173 to communicate with 5G core network 170. Moreover, SCEF becomes NEF, and subscription data base is UDM 178.

Session Management for Aggregating and Relaying UL Traffic

According to even another aspect of the application, it is quite possible that many remote UEs rely on the same relay UE 704 to forward their data to the network, and those remote UEs are usually constrained devices generating burst and small data. Relay UE 704 may consider aggregating the UL traffic from different remote UEs to achieve more efficient data transfer, especially when those UL data targeting at the same SCS/AS 808 are related to the same application.

For example, a large number of remote temperature sensors report readings to a common SCS/AS 808. The data from each sensor is very short, so it would be inefficient if the relay UE 704 forward each reading respectively to the SCS/AS 808.

Figure 12:
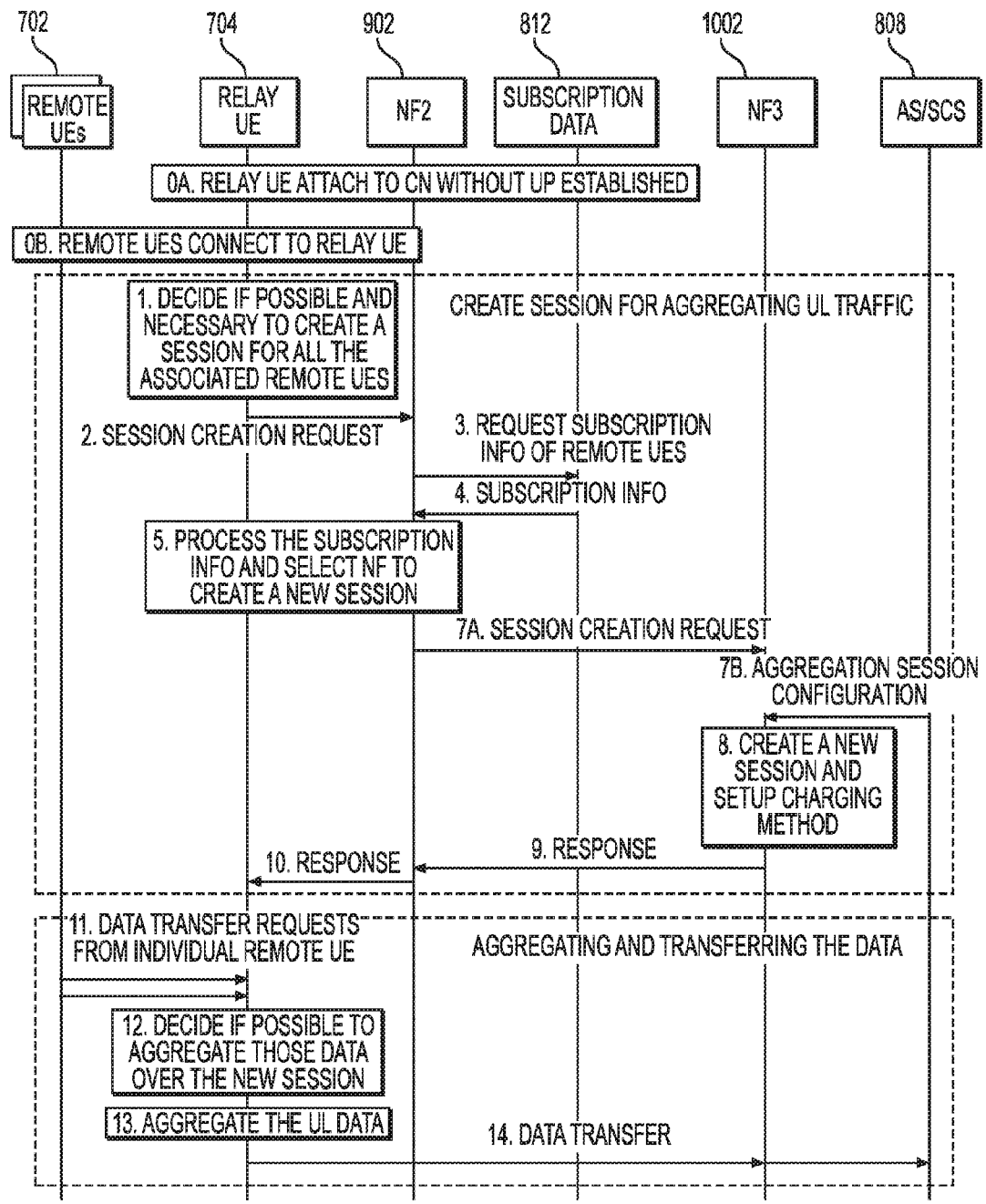
FIG. 12 is a diagram of a Procedure of Creating a Session and Aggregating UL Traffic by Relay UE

FIG. 12 shows how a relay UE 704 creates a session for transferring the UL traffic, and how the relay UE 704 does the aggregation and relaying. This session may be used only for UL and shared among a group of devices.

Step 0 of FIG. 12: relay UE 704 attaches to the network and remote UE 702 connects to the relay UE 704 in this pre-requisite step. The relay UE 704 may be provisioned to know if and how long it may buffer UL data from remote UE's before sending it to the network.

Step 1 of FIG. 12: when multiple remote UEs connect to the relay UE 704, the relay UE 704 may look up the opportunity to see if it is possible or necessary to create a session to aggregate the UL data. The relay UE 704 may make the decision based on following information:

(i) If those remote UEs want to connect to the same SCS/AS 808.

(ii) If those remote UEs run the same application.

(iii) If those remote UEs have similar QoS requirement for their UL data.

(iv) If those remote UEs have similar communication pattern.

(v) If those remote UEs have similar mobility pattern.

(vi) If those UE's indicate that their uplink data is bufferable and/or provide an acceptable buffer duration time.

Step 2 of FIG. 12: relay UE 704 requests NF2 902 to create a new session for aggregating and relaying the UL data for remote UEs which are associated with itself. In the message, relay UE 704 may indicate the following information in addition to those described in step 7 of FIG. 9:

(i) Aggregation indication: indicates if the session may carry aggregated UL traffic.

(ii) ACK mechanism: indicate how the SCEF 102 sends the acknowledgement to remote UE via relay UE 704. One possible method is that SCEF 102 sends one acknowledgement to relay UE, which then notifies individual remote UE 702 about the successful delivery. Another possible method is that SCEF 102 directly sends an acknowledgement to each remote UE 704 respectively. Yet another possible method is that SCEF 102 sends one possible method is that SCEF 102 to relay UE, which forwards the possible method is that SCEF 102 to individual remote UE by broadcast.

(iii) Maximum number: indicate the maximum number of remote UEs whose data could be aggregated together (iv) Aggregation layer: indicates which protocol layer the aggregation is supposed to be performed, e.g., NAS signaling, TCP/IP.

Steps 3-10 of FIG. 12: NF2 902 checks the subscription information of those remote UEs, selects the appropriate NF3 1002 to create a new session. In step 8, SCS/AS 808 may get notification from the NF3 1002 that a session is created for aggregating UL data from a list of remote UEs for a certain application. Note that NF3 1002 is also responsible for setting up the information record (including charging) method if the session carries the aggregated data, which could be done based on policy and charging rule configured by the operator or sponsors.

Steps 11-14 of FIG. 12: when real UL data comes to the relay UE 704, it performs the aggregation and forwards the data to the SCS/AS 808 via NF3 1002. The relay UE 704 may start a timer once receiving a first packet from a remote UE. When the timer expires, it checks if it is possible to aggregate the packets received within the period. The criteria introduced in step 1 could be used to make the decision. The relay UE 704 packs individual packet into an aggregated packet, which contains both control information and data from remote UEs. In addition, the relay UE 704 will add some common information as follows:

(i) Aggregation indication.

(ii) ID of target AS if all the data from remote UEs are destined to the same AS.

(iii) Transmission preference: indicate if the relay UE 704.

(iv) Charging method: indicate if the CN should charge each individual remote UE 702, indicate AS to sponsor the data transfer, or charge the relay UE 704.

The session created could be UL only, and shared among those remote devices. Essentially, this is a new type of session for UL traffic aggregation. For example, there could be 2 sessions between a remote UE 702 and a SCS/AS 808. One is shared only for UL traffic aggregation, and the other is dedicated for the remote UE 702 for both DL and UL. Depending on QoS and application requirements, the relay UE 704 could decide to relay the UL data over which session.

According to an embodiment, FIG. 12 assumes that the UL data is transferred by creating a new session first. It is possible that relay UE 704 aggregates the UL data and sends it over the CP. In this case, relay UE 704 still needs to communicate with NF2 902 first to make sure that NF2 902 and SCEF 102 are fine for aggregating the UL data. Each time the UE sends data towards the network for an aggregated session, the packet heard may indicate how many remote user's packet are in the aggregated packet and how big each individual packet is so that the network can properly parse the aggregated packet.

NF2 and NF3 could be different network entities in 5G core network depending on the configuration, for example, NF2 is AMF 172 and NF3 is UPF 176 or NEF, or NF2 is SMF 174 and NF3 is UPF 176 or NEF.

Charging for Indirect Connection

According to another aspect of the application, a Remote UE 702 may digitally sign each packet that it sends to the Relay UE 704. The signature may be a hash of any combination of the UE's private identity, the UE's public/external identifier, or the UE's private Key. The UE's private key may be agreed upon by the remote user and network operator. The remote user may enter the provide key and or identity via a GUI. This digital signature can be used to verify the source of the data so that the remote user is properly charged for generating the traffic and not the relay user. This approach also prevents the relay UE 704 from claiming that the data is from a remote UE 702 even if the data is from the relay UE 704. As described above, a new monitoring event could be added so that the SCS/AS 808 could get notified when the following events take place:

(i) A new relay UE 704 is authorized/de-activated for relaying data to the SCS/AS 808.

(ii) A new remote UE 702 is authorized/de-activated to communicate with SCS/AS 808 via a relay UE.

(iii) A new data type is request e.g. non-IP, or IP, etc.

(iv) A remote UE 702 starts or stops using power savings functionalities. In this case, SCS/AS 808 may buffer the DL data for the remote UE, or the network buffer the DL data instead.

(v) The relay schedule of an existing relay UE 704 is updated.

(vi) An application is added/removed from application list which is authorized for relay.

(vii) A session is created/updated/deleted for relaying data between remote UE 702 and the SCS/AS.

(viii) When the number of remote UEs goes above or below a certain threshold associate with a relay UE.

(ix) A relay UE enters or leaves a geographic area.

Figure 13:
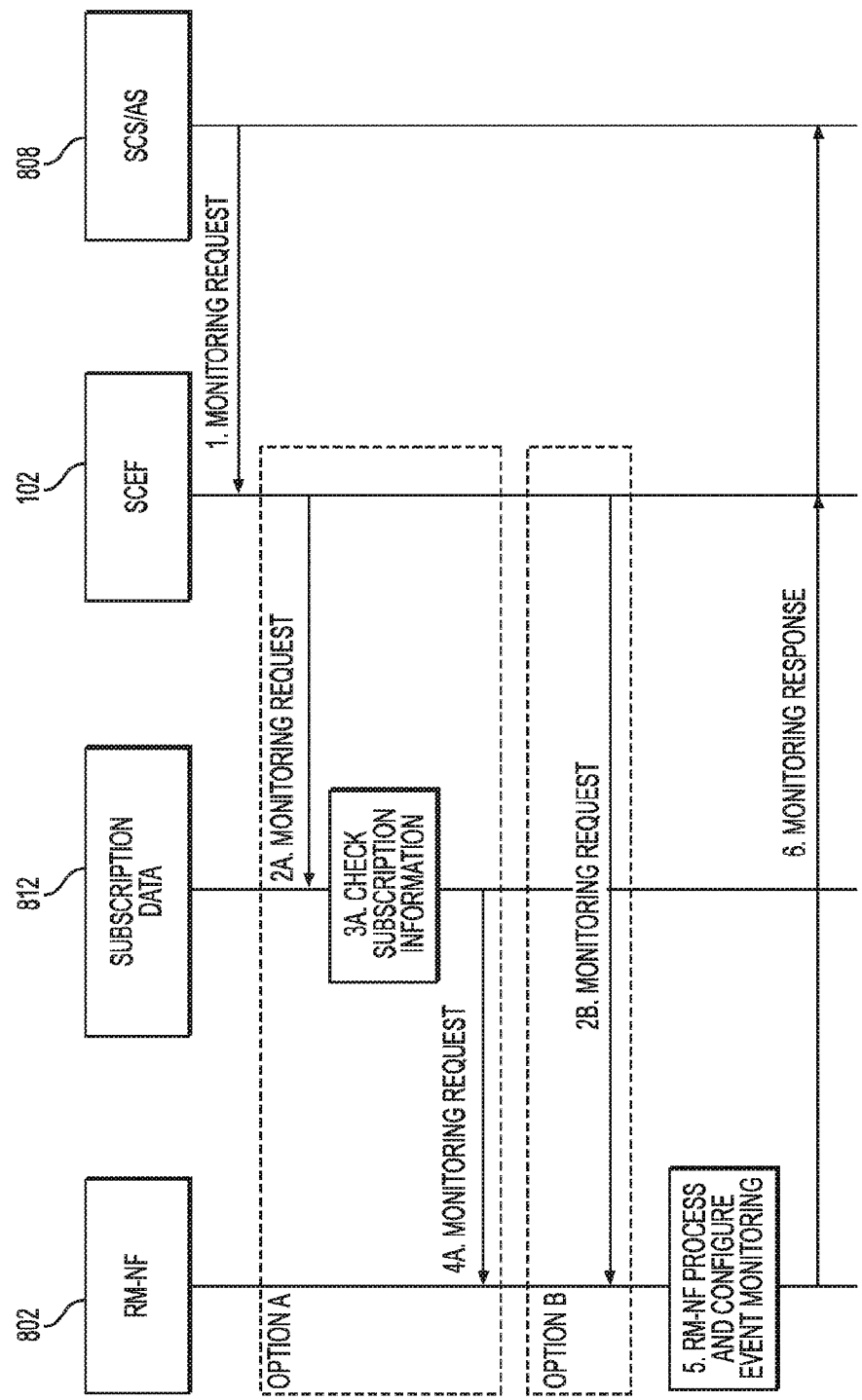
FIG. 13 is a diagram of a Monitoring Event Configuration: Relay Configuration Update.

According to another embodiment, FIG. 13 shows how a SCS/AS 808 subscribes/configures a new monitoring event at RM-NF 802 to get notified when there is a relay configuration update.

Step 1 of FIG. 13: SCS/AS 808 sends a monitoring request to SCEF 102 to setup a new type of monitoring event: relay configuration update. Any event described above belongs to this new event type. SCS/AS 808 may also indicate some other conditions regarding the monitoring event, such as a list of applications related to the event.

Step 2a-4a of FIG. 13: as option A, SCEF 102 could contact the subscription database 812, which forwards the monitoring request to the RM-NF 802 to setup the monitoring event.

Step 2b of FIG. 13: as option B, SCEF 102 could directly contact the RM-NF 802 to setup the monitoring event.

Step 5 of FIG. 13: RM-NF 802 setups the new monitoring event for SCS/AS 808.

Step 6 of FIG. 13: response is returned to the SCS/AS 808 via SCEF 102 and/or subscription database 812.

In the 5G context, SCEF could be NEF, and subscription data base becomes UDM 178.

Remote UE Connection Procedure for NIDD Over CP (MME-SCEF)

FIG. 5 illustrates the existing communication between ProSe remote UE and 3GPP network via ProSe UE-to-Network Relay, which delivers the IP data via the traditional user plane (UP). However, the flow of FIG. 5 does not support delivering non-IP data over the control plane (CP), i.e., MME-SCEF. This is especially useful for those IoT applications.

Figure 14:
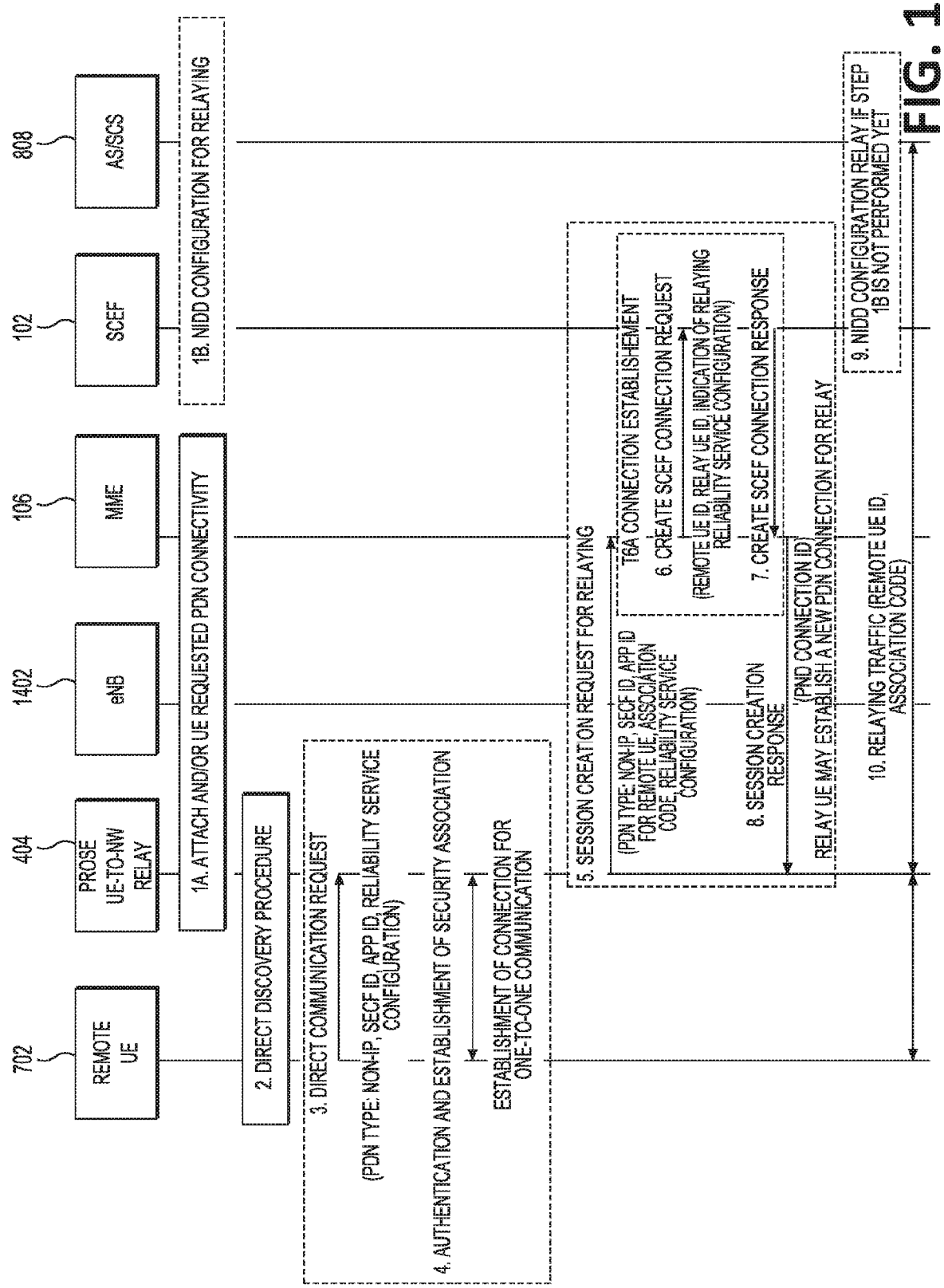
FIG. 14 is a diagram of NIDD Procedure of Relaying Non-IP Traffic via CP.

According to a further aspect, FIG. 14 shows a new procedure of NIDD for the remote UE 702 via ProSe UE-to-network Relay. This figure is an updated version of FIG. 5.4.4.1-1 from TS 23.303 [3GPP TS 23.303, Proximity-based services (ProSe), Stage 2, Release 13]:

Step 1a of FIG. 14 is a pre-requisite step, where relay UE attaches to the network and/or establishes the PDN connection.

Note that relay UE itself may not require NIDD through CP. In other words, the PDN connection for relay UE may be the traditional UP session.

Step 1b of FIG. 14 is optional, implying that AS/SCS 808 may or may not initiate the NIDD configuration process, which is independent of the PDN connection establishment for remote UE 702.

In step 2 of FIG. 14, remote UE 702 performs the discovery in proximity and connects to the relay UE. Specifically, the PC5_DISCOVERY message [3GPP TS 24.334: "Proximity-services (Prose) User Equipment (UE) to Proximity-services (ProSe) Function Protocol aspects; Stage 3", v13.4.1] may contain the following new parameter:

NIDD support indicator: indicate if the relay UE supports the NIDD, or if the remote UE 702 may require NIDD feature. This parameter may be used during the relay selection. Note that separate indicators may be used to indicate if the UE supports or requires NIDD.

In Step 3 of FIG. 14, the remote UE 702 sends a Direct Communication Request message [3GPP TS 24.334] to the relay UE to establish a direct connection between the remote and relay UE. In addition, remote UE 702 requests to establish a new PDU connection over CP for NIDD by inserting the following parameters in the message:

(i) Non-IP indicator: indicates that the new PDN connection to be established should support non-IP data.

(ii) SCEF ID: indicates which SCEF 102 should be involved with the non-IP PDN connection (iii) APN: indicates which SCEF 102 that the non-IP PDN connection is to connect (iv) UE Application ID: identify the application running on the remote UE 702 that will use this non-IP PDN connection. This is necessary since there may be multiple applications on the remote UE 702, each of which may require different types of PDN connections.

(v) SCS/AS Application ID: Identity of the SCS/AS 808 that the Non-IP data is targeting.

(vi) Reliability indicator: indicates if the remote UE 702 wants an acknowledgement after the data is successfully delivered to SCEF 102. In other words, if the remote UE 702 wants to use the reliability service for NIDD.

(vii) Reliability service mode: indicates if the reliability service is done by an end-to-end way (SCEF 102 sends ack directly to the remote UE 702) or by a hop-by-hop way (SCEF-MME-relay UE-remote UE) or both.

In step 4 of FIG. 14, upon receiving the request from remote UE 702, the relay UE initiates interaction with the remote UE 702 for mutual authentication, and builds the association with the remote UE 702. During the process, the relay UE may generate some association code indicating that the secured direct link is set up between the remote UE 702 and the relay UE.

In step 5 of FIG. 14, relay UE sends Session Creation Request to MME 106 for creating a non-IP PDN connection for NIDD. In addition to the information obtained from step 3, the relay UE may include the following information in the message:

Association code generated during direct link establishment process (i.e., steps 3 and 4): this information could be stored in the network (e.g., MME 106), so that network knows which remote UE 702 is served by which relay UE. When the remote UE 702 changes the serving relay UE, or switches from indirect communication to direct communication, or vice versa, including:

(i) Remote UE ID: include IMSI, IMEI, or both.

(ii) Sharing indication: indicates if the new non-IP PDN connection will be shared among multiple remote UEs.

(iii) Reliability service configuration as received in step 3.

Steps 6~7 of FIG. 14 follows the T6a establishment process [3GPP TS 23.682, Architecture enhancements to facilitate communications with packet data networks and applications, v13.5.0] with some new information described below (description can be found in step 3 and/or step 5):

(i) Association code.

(ii) APN.

(iii) UE application ID.

(iv) SCS/AS Application ID.

(v) Remote UE ID.

(vi) Sharing indication.

(vii) Reliability service configuration information consists of Reliability indicator and Reliability service mode.

In step 8 of FIG. 14, MME 106 responds to the relay UE containing EPS bearer identity and remote UE ID to the relay UE.

Step 9 of FIG. 14 is an optional NIDD configuration relay step if the NIDD configuration process is not done yet.

In step 10 of FIG. 14, remote UE 702 sends non-IP data to the AS/SCS 808 through relay UE, MME and SCEF. Relay UE may insert the remote UE ID or association code in the NAS signaling to the MME 106, so that network knows which entity will be charged especially when the non-IP PDN connection is shared among multiple remote UEs.

The non-IP data transfer from remote UE 702 to relay UE may use the PC5 CP [3GPP TS 23.303, Proximity-based services (ProSe), Stage 2, Release 13] since PC5 UP is IP based. Therefore, the remote UE 702 will insert the non-IP data into a PC5 signaling protocol message [3GPP TS 24.334] along with the remote UE ID.

If reliability service is enabled in an end-to-end manner, the acknowledgement will be sent from SCEF 102 to remote UE 702 once the non-IP data is successfully delivered to SCEF 102 in step 10; if a hop-by-hop reliability service is setup, the network entities will send acknowledge respectively. For the acknowledgement from relay UE to remote UE 702 over PC5 CP, the relay UE will insert an acknowledgement indicator so that the remote UE 702 understands that the non-IP data is successfully delivered to the SCEF 102. If reliability service is enabled in a hop-by-hop manner, the relay UE will send an acknowledgement to the remote UE 702 after it receives the data correctly from the remote UE 702 or after the data is successfully sent to the eNodeB 1402 (i.e., after the relay UE receives an RLC acknowledgement from the eNodeB 1402).

Figure 15:
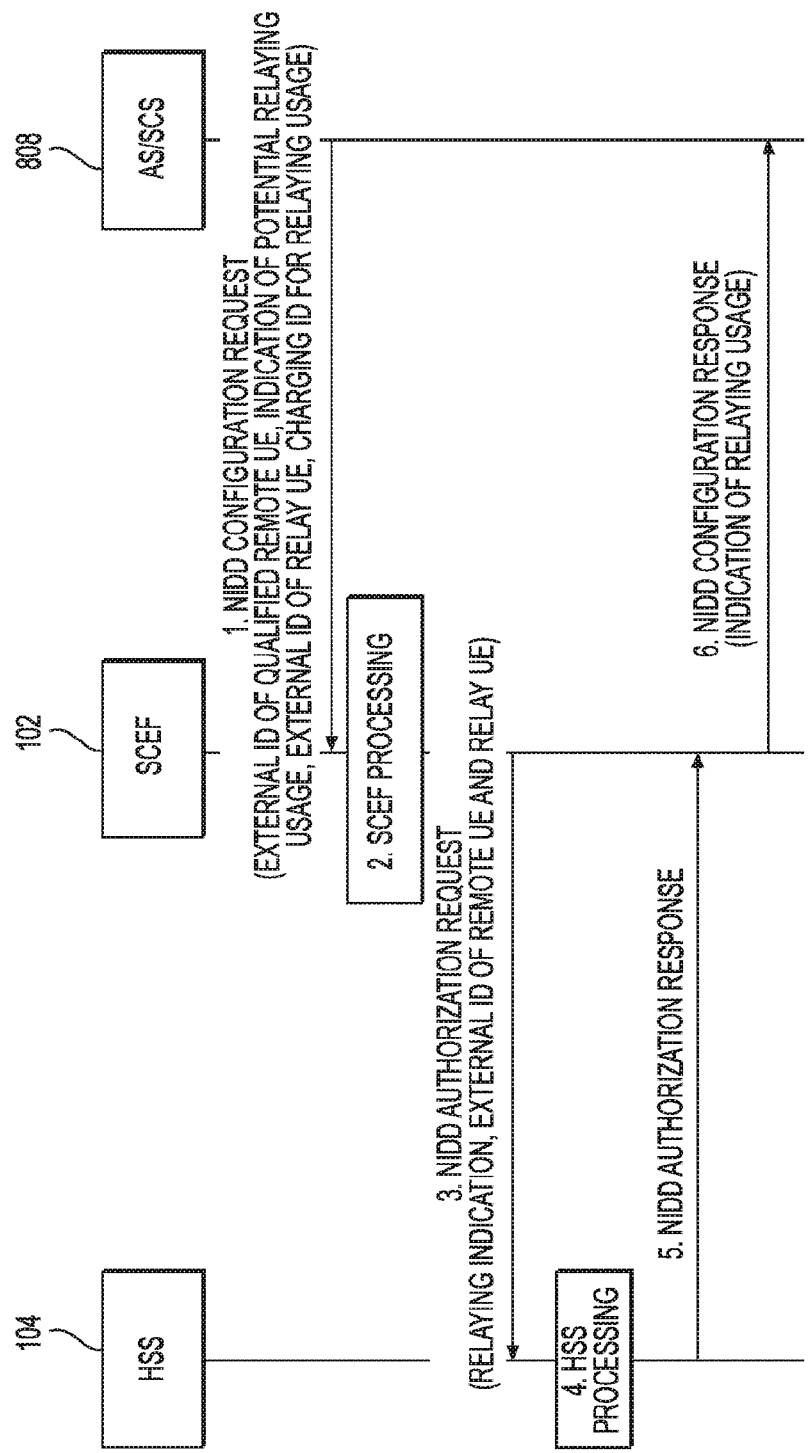
FIG. 15 is a diagram of a procedure of NIDD Configuration for Relaying.

According to another embodiment, FIG. 15 shows the NIDD configuration with relay support. AS/SCS 808 initiates the process, and inserts some new parameters to indicate if the relay is support for the NIDD, and which UE may use NIDD as a remote UE 702. Note, FIG. 15 is a new version of NIDD configuration process regarding the relay support. The original NIDD configuration process can be found in [3GPP TS 23.682, Architecture enhancements to facilitate communications with packet data networks and applications, v13.5.0].

In step 1 of FIG. 15, AS/SCS 808 sends NIDD Configuration Request message to SCEF 102. Some new parameters are included for supporting the relay:

(i) Relay support indication: indicates that relay is supported by this NIDD, i.e., a UE could send/receive non-IP data to/from AS/SCS 808 via a relay UE.

(ii) Charging ID for relay usage: indicates the charging method for relaying the non-IP data over this NIDD path.

(iii) IDs of possible remote UEs.

(iv) Application IDs.

(v) Reliability service configuration information consists of Reliability indicator and Reliability service mode.

In step 2 of FIG. 15, SCEF 102 processes the request.

In steps 3~5 of FIG. 15, SCEF 102 communicates with HSS 104 for NIDD authorization with the following new information:

(i) Relay support indication.

(ii) External ID of remote UE and relay UE.

In step 6 of FIG. 15, SCEF 102 responds AS/SCS 808 with NIDD Configuration Response.

An SCS/AS 808 may request a notification when a UE becomes reachable, loses connectivity, detaches, etc. Thus, the SCS/AS 808 should also be notified when a UE becomes reachable, loses connectivity, detaches, because of its connection to the relay UE 704. The SCS/AS 808 may also use this monitoring information to manage the resource allocation and QoS for applications, and request core network to allocate resource as well.

AS/SCS 808 could request to get notified when a new remote UE is connected to the network via a relay UE 704, and/or a remote UE disconnects with the relay UE 704. This is also applied to the scenario when a remote UE 702 switches from indirect communication to direct communication, or vice versa.

In addition, service provider (i.e., AS/SCS 808) may use this information to make decision if the application traffic is sponsored or not. For example, if a UE has direct communication, service provider may sponsor that; if UE has an indirect communication via a relay, which is not a subscription/client of AS/SCS 808, the service provider may determine not to sponsor the application traffic.

Figure 16:
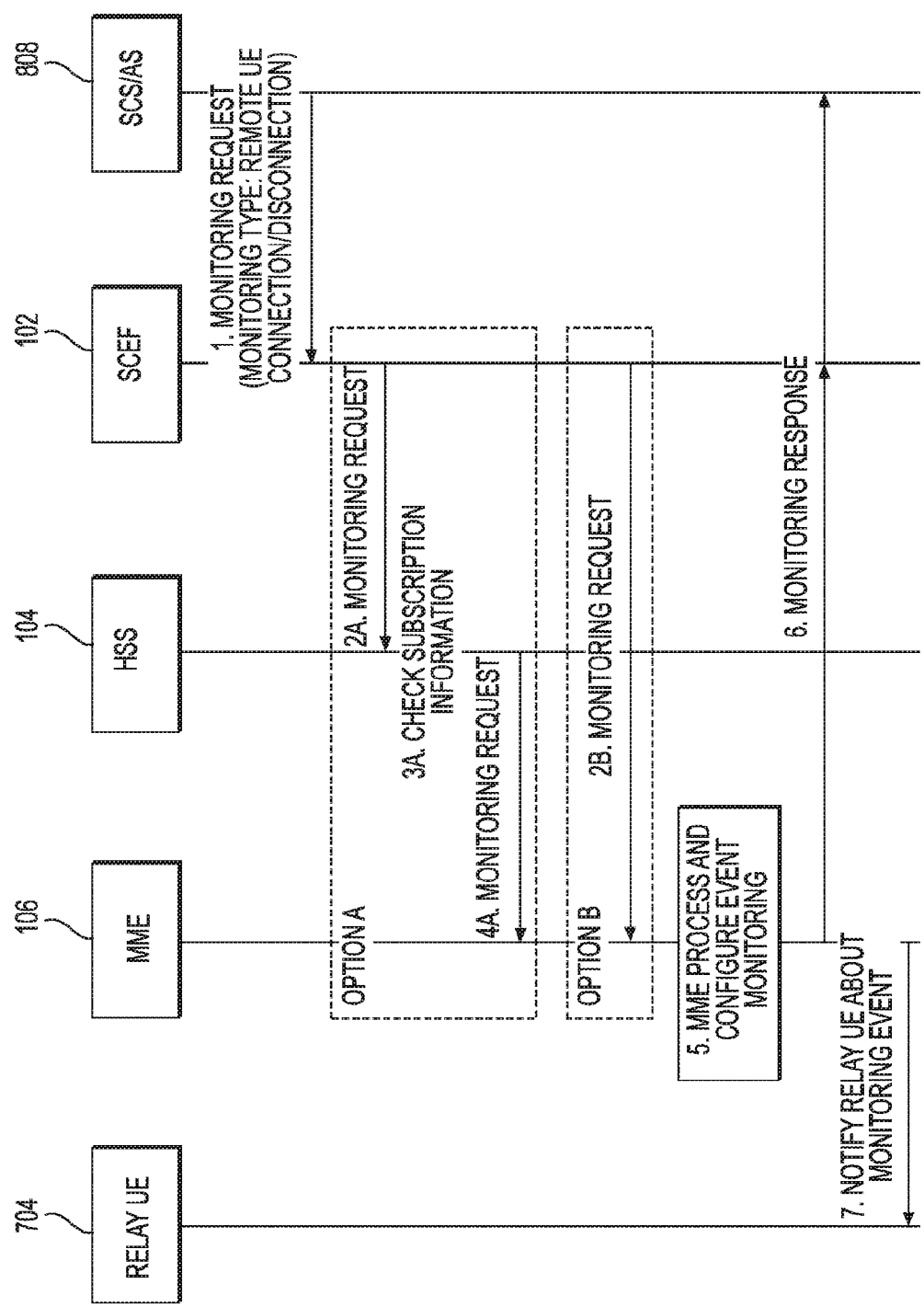
FIG. 16 is a diagram of Monitoring Event Configuration for a Remote UE Connection/Disconnection.

FIG. 16 shows an updated monitoring request procedure where the SCS/AS 808 requests to be notified if the UE's connection changed from indirect to direct or direct to indirect. The MME 106 may subsequently send a notification to the SCS/AS 808 (via the SCEF) whenever the UE's connection changes.

Since there may be multiple remote UEs using the same relay UE 704 or the same PDN connection to transfer data, it is important for core network to be able to differentiate source of the traffic. In other words, the network should be able to determine which remote UE generates the traffic. As shown in FIG. 14, the remote UE 702 may insert the following information when sending data to the relay UE 704 in the PC5 signaling protocol message [3GPP TS 24.334]:

(i) Remote UE ID (ii) External ID of remote UE (iii) Signature of remote UE (iv) The Core Network will use this electronic signature and the external identifier to determine and authenticate the identity of the remote UE 702. This will allow the CN to charge the remote UE 702 for the traffic.

(v) Interfaces, such as Graphical User Interfaces (GUIs), can be used to assist user to control and/or configure functionalities related to session management with relaying and charging for indirect connection. The parameters defined for relay configuration could be provisioned by the end user or operator through a user interface. In addition, the relay UE 704 or network operator could retrieve and display the relay statistics through the user interface.

Figure 17:
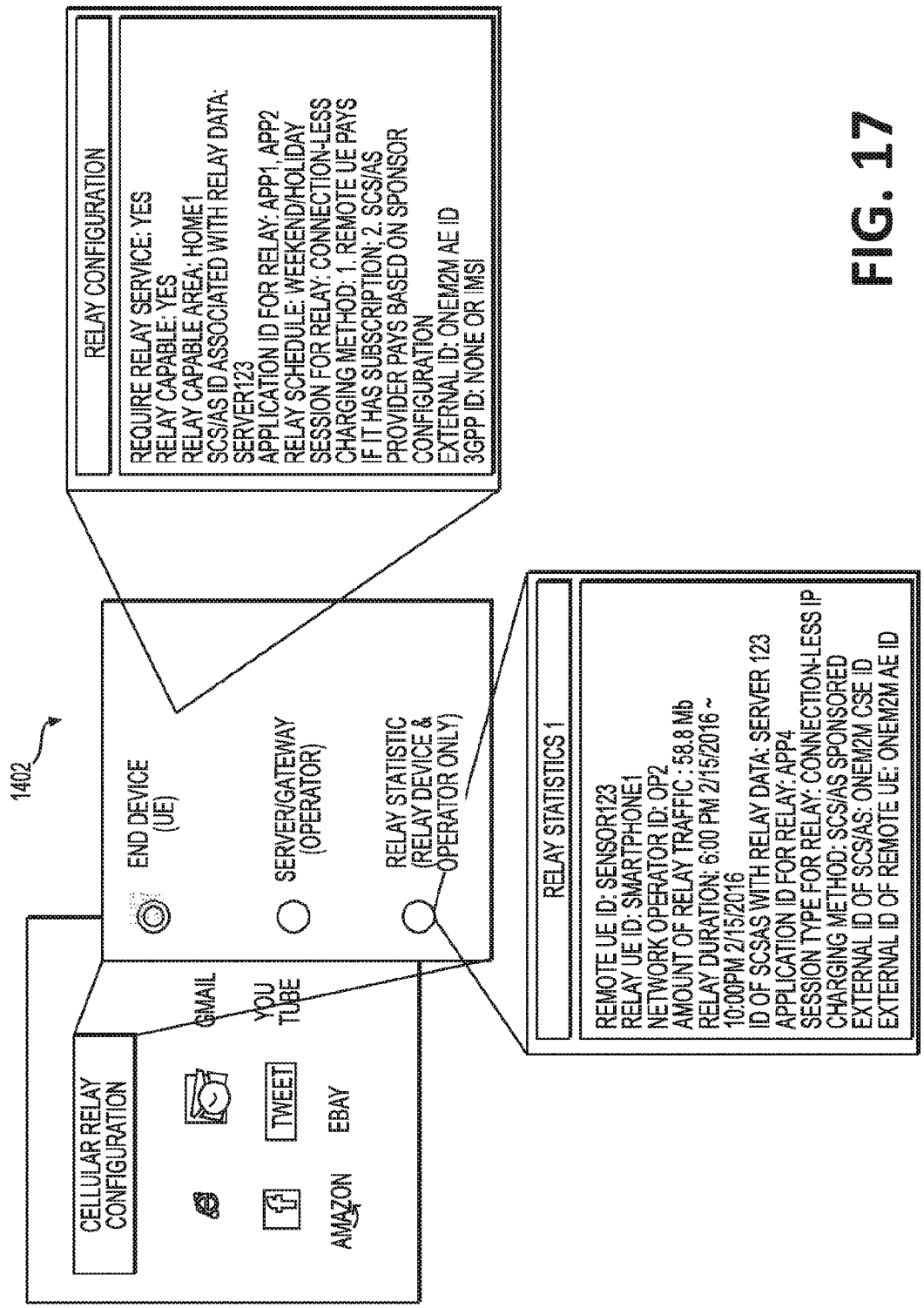
FIG. 17 is a diagram of a User Interface of Configuring Relay Support

FIG. 17 is a diagram that illustrates an exemplary interface 1702 implemented for configuring or programming those parameters with default values, as well as enabling or disabling relay service. It is to be understood that interface 1702 can be produced using displays such as those shown in FIGS. 18C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Figure 18A:
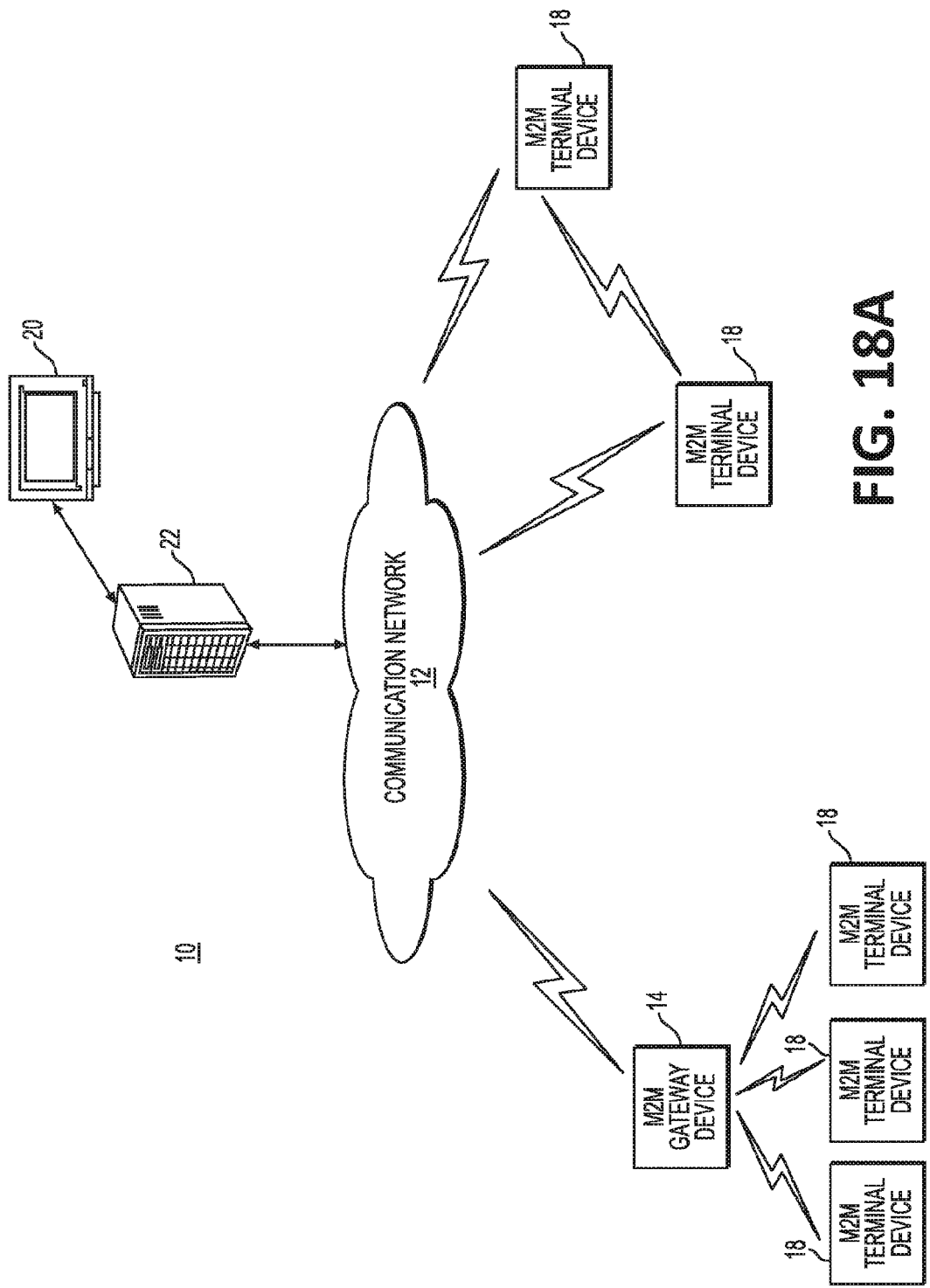
FIG. 18A is a diagram of a M2M/IoT/WoT communication system that includes a communication network.

FIG. 18A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as SCEF 102, HSS 104, MME 106 and 502, remote UE 402 and 702, ProSe UE-to-Network Relay 404, S-GW 504, P-GW 506, relay UE 704 804 and 806, mobile core network 706, application server 708, RN-NF 802, subscription database 812, analytics NF 810, SCS/AS 808, NF2 902, NF3 1002, and logical entities to create user interfaces such as GUI 1702.

As shown in FIG. 18A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 18A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 18B:
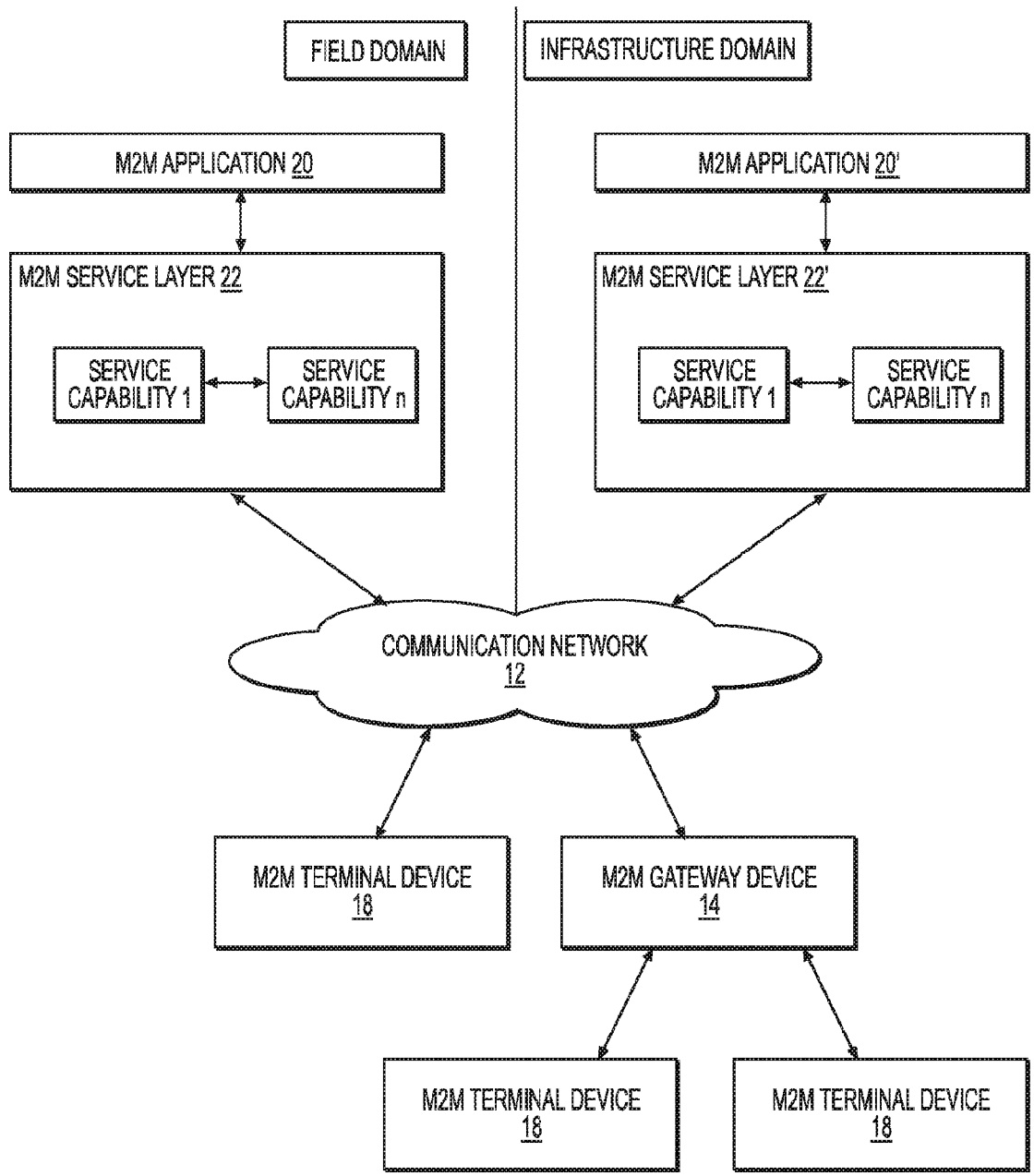
FIG. 18B is a diagram of an illustrated M2M service layer in the field domain that provides services for the M2M application, M2M gateway devices, and M2M terminal devices and the communication network.

Referring to FIG. 18B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as SCEF 102, HSS 104, MME 106 and 502, remote UE 402 and 702, ProSe UE-to-Network Relay 404, S-GW 504, P-GW 506, relay UE 704 804 and 806, mobile core network 706, application server 708, RN-NF 802, subscription database 812, analytics NF 810, SCS/AS 808, NF2 902, NF3 1002, and logical entities to create user interfaces such as GUI 1702. The M2M service layer 22 may be implemented by one or more servers, computers, devices, virtual machines (e.g. cloud/storage farms, etc.) or the like, including for example the devices illustrated in FIGS. 18C and 18D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 18B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as SCEF 102, HSS 104, MME 106 and 502, remote UE 402 and 702, ProSe UE-to-Network Relay 404, S-GW 504, P-GW 506, relay UE 704 804 and 806, mobile core network 706, application server 708, RN-NF 802, subscription database 812, analytics NF 810, SCS/AS 808, NF2 902, NF3 1002, and logical entities to create user interfaces such as GUI 1702 may be hosted within a M2M service layer instance hosted by an M2M node, such as an M2M server, M2M gateway, or M2M device, as shown in FIG. 18B. For example, the logical entities such as SCEF 102, HSS 104, MME 106 and 502, remote UE 402 and 702, ProSe UE-to-Network Relay 404, S-GW 504, P-GW 506, relay UE 704 804 and 806, mobile core network 706, application server 708, RN-NF 802, subscription database 812, analytics NF 810, SCS/AS 808, NF2 902, NF3 1002, and logical entities to create user interfaces such as GUI 1702 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 18C or FIG. 18D described below.

Further, logical entities such as SCEF 102, HSS 104, MME 106 and 502, remote UE 402 and 702, ProSe UE-to-Network Relay 404, S-GW 504, P-GW 506, relay UE 704 804 and 806, mobile core network 706, application server 708, RN-NF 802, subscription database 812, analytics NF 810, SCS/AS 808, NF2 902, NF3 1002, and logical entities to create user interfaces such as GUI 1702 can implemented as part of an M2M network that uses a Service Oriented Architecture (SOA) and/or a Resource-Oriented Architecture (ROA) to access services of the present application.

Figure 18C:
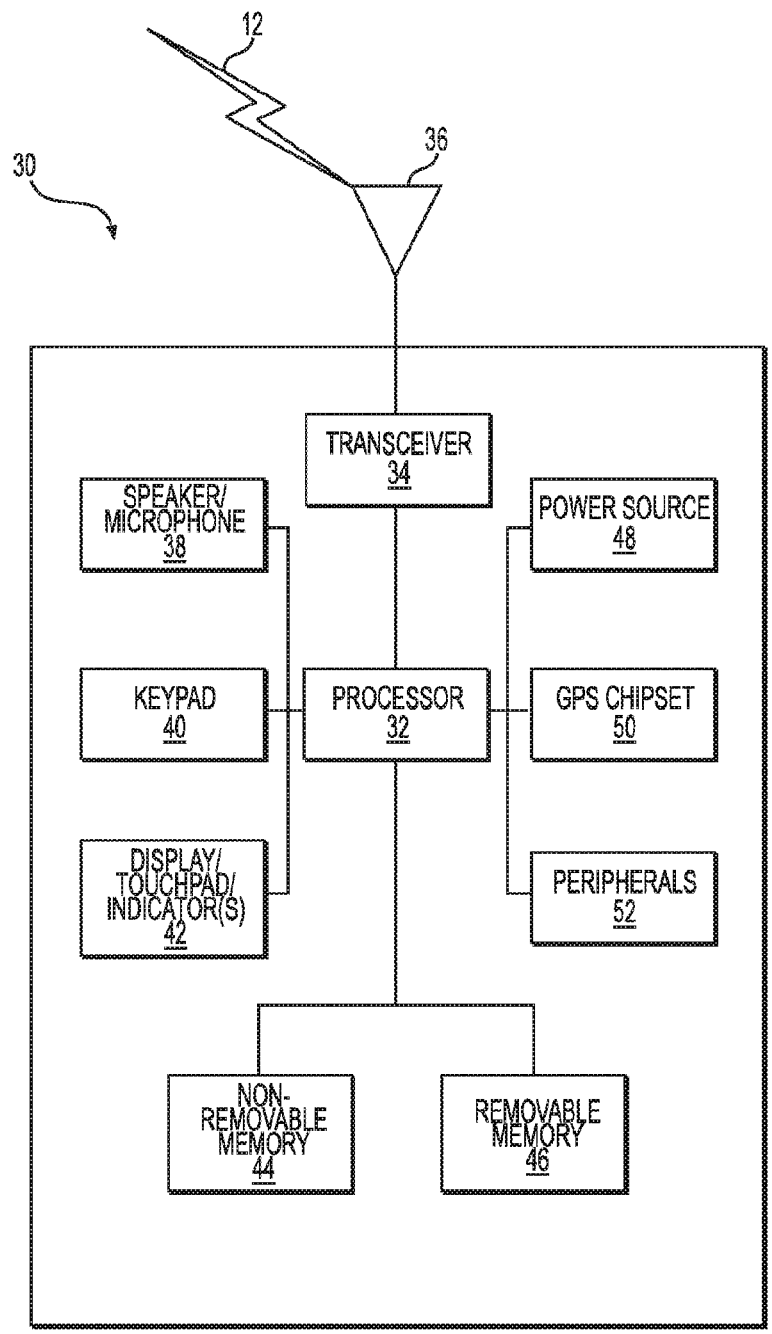
FIG. 18C is a diagram of an exemplary device that may be used to implement any of the network nodes, devices or apparatuses described herein.

FIG. 18C is a block diagram of an example hardware/software architecture of a M2M network node 30, such as an M2M device 18, an M2M gateway 14, an M2M server, or the like. The node 30 can execute or include logical entities such as SCEF 102, HSS 104, MME 106 and 502, remote UE 402 and 702, ProSe UE-to-Network Relay 404, S-GW 504, P-GW 506, relay UE 704 804 and 806, mobile core network 706, application server 708, RN-NF 802, subscription database 812, analytics NF 810, SCS/AS 808, NF2 902, NF3 1002, and logical entities to create user interfaces such as GUI 1702. The device 30 can be part of an M2M network as shown in FIG. 18A-B or part of a non-M2M network. As shown in FIG. 18C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 18C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 18C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 18C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control visual indications on the display to reflect the status of the system or to obtain input from a user or display information to a user about capabilities or settings. A graphical user interface, which may be shown on the display, may be layered on top of an API to allow a user to interactively do functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

Figure 18D:
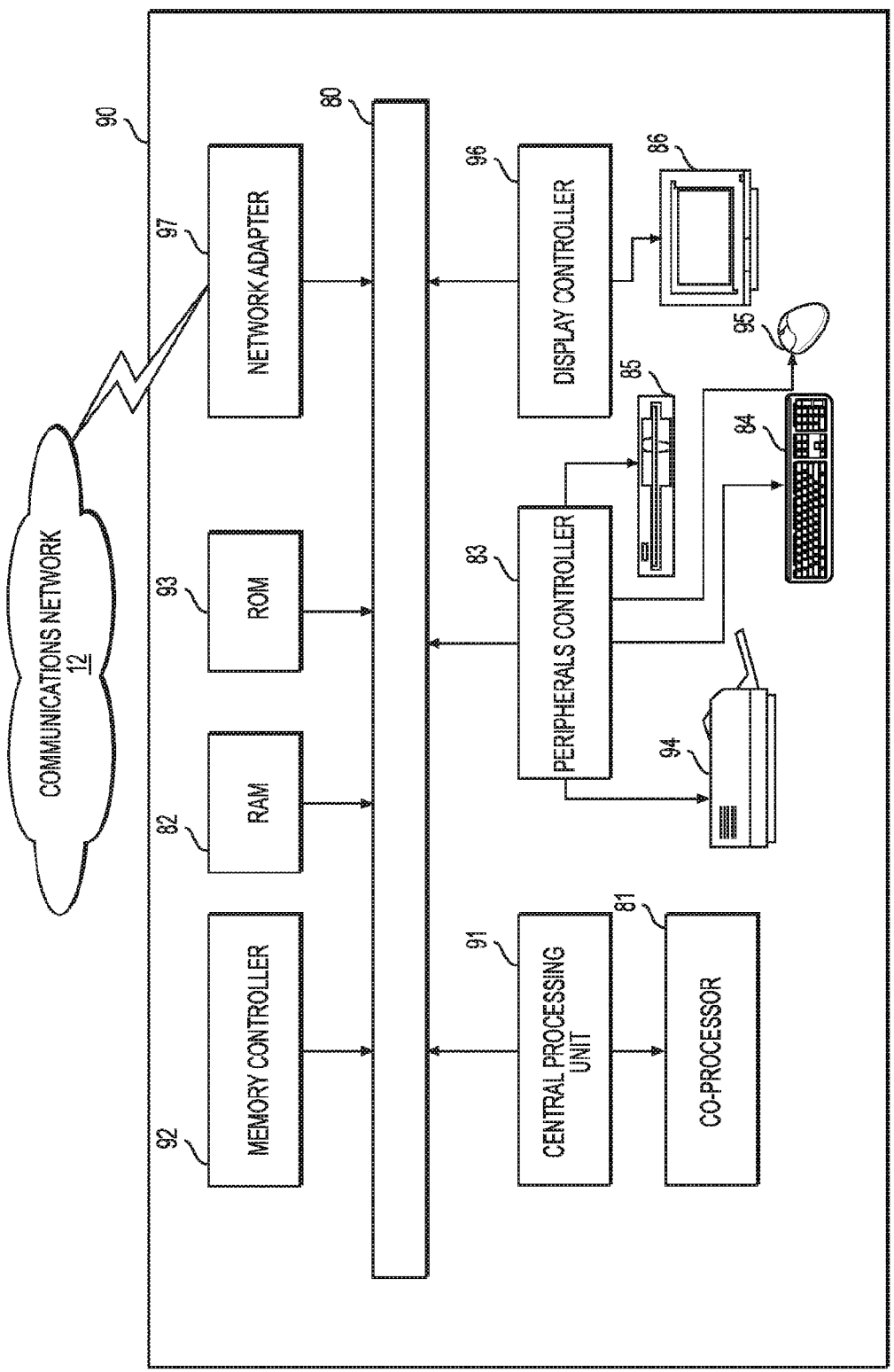
FIG. 18D is a block diagram of a computer system or server that may be used to implement any of the network nodes, devices or apparatuses described herein.

FIG. 18D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as SCEF 102, HSS 104, MME 106 and 502, remote UE 402 and 702, ProSe UE-to-Network Relay 404, S-GW 504, P-GW 506, relay UE 704 804 and 806, mobile core network 706, application server 708, RN-NF 802, subscription database 812, analytics NF 810, SCS/AS 808, NF2 902, NF3 1002, and logical entities to create user interfaces such as GUI 1702. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 18A and FIG. 18B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 18A-B or the device 30 of FIG. 18 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as SCEF 102, HSS 104, MME 106 and 502, remote UE 402 and 702, ProSe UE-to-Network Relay 404, S-GW 504, P-GW 506, relay UE 704 804 and 806, mobile core network 706, application server 708, RN-NF 802, subscription database 812, analytics NF 810, SCS/AS 808, NF2 902, NF3 1002, and logical entities to create user interfaces such as GUI 1702 may be embodied in the form of the computer executable instructions stored on a computer-readable storage medium.

Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed is:

1. A core network comprising:
a non-transitory memory including instructions stored thereon for transferring infrequent small data to a service capability or application server on a 5G network; and
a processor operably coupled to the non-transitory memory, the processor configured to execute the instructions of:
receiving, at the core network, a data transfer request message from a relay user equipment (UE) over a control plane path, where the data transfer request message includes uplink traffic generated at a remote UE and control information of the remote UE, where the uplink traffic and control information is sent by the remote UE via direct connection with the relay UE, and where the control information includes a first identifier and electronic signature of the remote UE;
determining the uplink traffic transferred over the control plane path via a non-access stratum (NAS) signal is from the remote UE;
using the first identifier and electronic signature of the remote UE to authenticate the remote UE;
querying a subscription database in the core network for subscription information of the remote UE based on the control information;
receiving the subscription information from the database, where the subscription information includes a second identifier of the remote UE and an identity of a network function to send the uplink traffic;
processing the received subscription information; and
selecting the network function for transmitting the uplink traffic to the application server based on the subscription information.

2. The core network of claim 1, wherein the subscription information is selected from id of the remote UE, service capability exposure function id, charging reference number of the remote UE, location id for sending the message, authentication information of the remote UE, authorization information of the remote UE and combinations thereof.

3. The core network of claim 2, wherein the id of the remote UE includes a new identity assigned to the remote UE.

4. The core network of claim 1, wherein the control information is selected from application id, destination id, data network identifier, subscription identity, external id, quality of service requirements of the uplink traffic attach indication, remote UE electronic signature and combinations thereof.

5. The core network of claim 1, wherein the processing instruction includes calculating a new identity and security key for the remote UE.

6. The core network of claim 1, wherein the processor is further configured to perform the instructions of creating an attachment/registration status for the remote UE in the network.

7. The core network of claim 1, wherein the processor is further configured to perform the instructions of:
receiving a session create request message from the relay UE on behalf of the remote UE;
sending a session create request message to a network function in the core network; and
receiving a reply from the network function.

8. The core network of claim 7, wherein the session create request message includes information selected from type of session; scope of usage of the session, traffic direction, active duration of the session, quality of service requirement of the session, multiplexing option, and combinations thereof.

9. The core network of claim 1, wherein the direct connection between the remote UE and the relay UE are established over the PC5 interface, and includes one or more protocols including discovery control signal transfer and data traffic transfer within proximity.

10. A core network comprising:
a non-transitory memory including instructions stored thereon for transferring downlink data to a remote user equipment (UE) unattached to the core network; and
a processor operably coupled to the non-transitory memory, the processor configured to execute the instructions of:
determining the downlink data transferred over a control plane path via a non-access stratum (NAS) signal is for the remote UE;
using a first identifier and electronic signature of the remote UE to authenticate the remote UE;
receiving, from a service capability or application server, the downlink data for forwarding to a network function associated with the remote UE;
querying a subscription database in the core network for subscription information including a second identifier of the remote UE and an identity of the network function based on the received downlink data;
locating the network function from the querying instruction; and
sending the downlink data to the remote UE via the network function, through a relay UE via a direct connection with the remote UE.

11. The core network of claim 10, wherein the processor is further configured to execute the instructions of:
determining, at the network function, a status of a relay UE and remote UE for receiving the downlink data; and
paging the relay UE.

12. The core network of claim 10, wherein the direct connection between the remote UE and the relay UE are established over the PC5 interface, and includes one or more protocols including discovery control signal transfer and data traffic transfer within proximity.

13. A method comprising:
receiving, at a core network via a 5G network, a data transfer request message from a relay user equipment (UE) over a control plane path, where the data transfer request message includes uplink traffic generated at a remote UE and control information of the remote UE, where the uplink traffic and control information is sent by the remote UE via a direct connection with the relay UE, and where the control information includes a first identifier of the remote UE and an electronic signature of the remote UE;
determining the uplink traffic transferred over control plane path via a non-access stratum (NAS) signal is from the remote UE;
using the first identifier and electronic signature of the remote UE to authenticate the remote UE;
querying, at the core network, a subscription database for subscription information of the remote UE based on the control information;
receiving, at the core network, the subscription information from the database, where the subscription information includes a second identifier of the remote UE and an identity of a network function to send the uplink traffic;

processing, at the core network, the received subscription information; and selecting, at the core network, the network function for transmitting the uplink traffic to a server based on the subscription information.

14. The method of claim 13, wherein the subscription information is selected from id of the remote UE, service capability exposure function id, charging reference number of the remote UE, location id for sending the message, authentication information of the remote UE, authorization information of the remote UE and combinations thereof.

15. The method of claim 14, wherein the id of the remote UE includes a new identity assigned to the remote UE.

16. The method of claim 13, wherein the control information is selected from application id, destination id, data network identifier, subscription identity, external id, quality of service requirements of the uplink traffic, attach indication, remote UE electronic signature and combinations thereof.

17. The method of claim 13, wherein the processing step includes calculating a new identity and security key for the remote UE.

18. The method of claim 13, further comprising:
creating, at the core network, an attachment/registration status for the remote UE in the 5G network.

19. The method of claim 13, further comprising:
receiving, at the core network, a session create request message from the relay UE on behalf of the remote UE;
sending, from the core network, a session create request message to a network function located in the core network; and
receiving, at the core network, a reply from the network function.

20. The method of claim 19, wherein the session creation request message includes information selected from type of session, scope of usage of the session, traffic direction, active duration of the session, quality of service requirement of the session, multiplexing option, and combinations thereof.

* * * * *

UNITED STATES PATENT AND TRADEMARK OFFICE
CERTIFICATE OF CORRECTION

| | | |
|---|---|---|
| PATENT NO. | : 11,297,660 B2 | Page 1 of 1 |
| APPLICATION NO. | : 16/339517 | |
| DATED | : April 5, 2022 | |
| INVENTOR(S) | : Li et al. | |

It is certified that error appears in the above-identified patent and that said Letters Patent is hereby corrected as shown below:

On the Title Page

Item (56) In Other Publications,
Under Column No. 2, Line no. 2, Replace, "(3GPP), Nobile Competence" with -- (3GPP), Mobile Competence --

In the Claims

Under Column No. 37, Line no. 48, Replace, "uplink traffic attach" with -- uplink traffic, attach --

Signed and Sealed this
Fifth Day of July, 2022

*Katherine Kelly Vidal*

Katherine Kelly Vidal
*Director of the United States Patent and Trademark Office*